(12) United States Patent
Wakeen et al.

(10) Patent No.: US 10,168,866 B2
(45) Date of Patent: Jan. 1, 2019

(54) METHODS AND SOFTWARE FOR FACILITATING THEME-BASED ONLINE SOCIAL INTERACTION, SUPPORT, AWARENESS, AND LEARNING

(71) Applicants: Ann Marie Wakeen, East Calais, VT (US); Catherine E. O'Brien, East Calais, VT (US)

(72) Inventors: Ann Marie Wakeen, East Calais, VT (US); Catherine E. O'Brien, East Calais, VT (US)

(*) Notice: Subject to any disclaimer, the term of this patent is extended or adjusted under 35 U.S.C. 154(b) by 261 days.

(21) Appl. No.: 14/775,557

(22) PCT Filed: Mar. 13, 2014

(86) PCT No.: PCT/US2014/026604
§ 371 (c)(1),
(2) Date: Sep. 11, 2015

(87) PCT Pub. No.: WO2015/020697
PCT Pub. Date: Feb. 12, 2015

(65) Prior Publication Data
US 2016/0026346 A1    Jan. 28, 2016

Related U.S. Application Data

(60) Provisional application No. 61/779,034, filed on Mar. 13, 2013.

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04847* (2013.01); *G06Q 10/107* (2013.01); *H04L 65/403* (2013.01); *G06Q 50/01* (2013.01)

(58) Field of Classification Search
CPC ...................................................... G06F 3/048
See application file for complete search history.

(56) References Cited

U.S. PATENT DOCUMENTS 8,375,331 B1 * 2/2013 Mayers .................. G06Q 50/01
705/319
9,240,000 B2 * 1/2016 Roy ....................... G06Q 10/10
(Continued)

OTHER PUBLICATIONS

Outlook 2007 for Dummies, Flagging E-mail Messages in Outlook, by Bill Dyszel (Year: 2007).*
(Continued)

*Primary Examiner* — Mahelet Shiberou
(74) *Attorney, Agent, or Firm* — Downs Rachlin Martin PLLC

(57) ABSTRACT

Online social-interaction systems that provide any of a variety of features that promote positive behaviors, such as social interaction, compassion, support, awareness, and learning. In some embodiments, an online social-interaction system provides multiple private journals that members of the system can selectively share with other members of the social-interaction system. The private journals may be directed to aspects, such as practices, beliefs, tenets, etc., of the corresponding community. In some embodiments, private journals are provided with action-request features and functionalities that allow other members to accept action requests and create followup lists for following up on such requests. In some embodiments, private journals are provided with features that allow members to share helpful resources. In some embodiments, features and functionalities are provided to allow members to participate in meditation sessions.

20 Claims, 15 Drawing Sheets

(51) Int. Cl.
*G06Q 10/10* (2012.01)
*G06F 3/0484* (2013.01)
*H04L 29/06* (2006.01)
*G06Q 50/00* (2012.01)

(56) References Cited

U.S. PATENT DOCUMENTS

| | | | |
|---|---|---|---|
| 9,600,297 B1* | 3/2017 | Buyukkokten | G06F 3/0481 |
| 2003/0182371 A1* | 9/2003 | Worthen | G06Q 10/10 |
| | | | 709/204 |
| 2005/0055264 A1* | 3/2005 | Gallick | G06Q 10/06311 |
| | | | 705/7.15 |
| 2008/0306851 A1 | 12/2008 | Weyerman | |
| 2009/0313550 A1* | 12/2009 | Kim | G06F 17/30 |
| | | | 715/744 |
| 2010/0205179 A1 | 8/2010 | Carson et al. | |
| 2011/0022621 A1* | 1/2011 | Luo | G06Q 30/02 |
| | | | 707/769 |
| 2011/0276396 A1 | 11/2011 | Rathod | |

OTHER PUBLICATIONS

International Search Report dated Jan. 22, 2015, issued in connection with related PCT/US14/26604, filed Mar. 13, 2014.
Written Opinion dated Jan. 22, 2015, issued in connection with related PCT/US14/26604, filed Mar. 13, 2014.

* cited by examiner

METHODS AND SOFTWARE FOR FACILITATING THEME-BASED ONLINE SOCIAL INTERACTION, SUPPORT, AWARENESS, AND LEARNING

RELATED APPLICATION DATA

This application claims the benefit of priority of U.S. Provisional Patent Application Ser. No. 61/779,034, filed on Mar. 13, 2013, and titled "ONLINE SYSTEM FOR INTRA- AND INTER-RELIGION SOCIAL INTERACTION AND LEARNING," which is incorporated by reference herein in its entirety.

FIELD OF THE INVENTION

The present invention generally relates to the field of online social-interaction systems. In particular, the present invention is directed to method and software for facilitating theme-based online social interaction, support, awareness, and learning.

BACKGROUND

Religion and spirituality play important roles in the lives of many people around the world. Typically, however, any individual's religious/spiritual community is largely centered where they live. Especially in the cases of rural regions, communities of even dominant religions can be quite small, and members of less dominant religions can feel isolated from their respective religious communities. In addition and unfortunately, a number of religions have longstanding intolerance for other religions. However, such intolerance is often based on historical events caused by human misjudgment and subsequent misunderstanding or lack of knowledge of one religion by members of another religion.

SUMMARY OF THE DISCLOSURE

In one implementation, the present disclosure is directed to a method of facilitating interaction among members of an online social-interaction system wherein the members share a common aspect, the method being executed by the online social-interaction system. The method includes providing a membership user interface designed and configured to allow each of the members to join the online social-interaction system; in response to each member joining the online social-interaction system, providing that member with at least one private journal, wherein said at least one private journal has a name identifying the common aspect and includes a new-entry user interface designed and configured to allow each member to select to share a new entry only with one of 1) just me, 2) close friends, and 3) All Friends; receiving the new entry; receiving a user selection from one of the members of one of 1) just me, 2) close friends, and 3) All Friends; and sharing the new entry with the one of 1) just me, 2) close friends, and 3) All Friends corresponding to the user selection.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Some aspects of the present invention are directed to providing an online social-interaction system that provides members of multiple religions the ability to interact with one another and form individual communities. As described in detail below, examples of features and functionalities of the present invention include, among others, features and functionalities for: 1) providing each member of the social-interaction system with one or more private journals that she/he can share with other members of the social interaction system; 2) providing each member with the ability to request an action of one or more other members; 3) providing each member with the ability to respond to and manage action requests; 4) providing members the ability to volunteer to respond to action requests; 5) providing private journals that allow posting resource-laden posts to a shared resource center; and 6) providing each member with the ability to participate in online meditation practices. As those skilled in the art will readily appreciate, the foregoing features and functionalities, as well as features and functionalities described below, can be used in any suitable combination as needed to suit a particular purpose. Those skilled in the art will also recognize that these features and functionalities can be implemented in suitable software stored and executed on one or more computing devices, such as one or more servers, such as a web server, linked to the Internet or other network.

Figure 1:
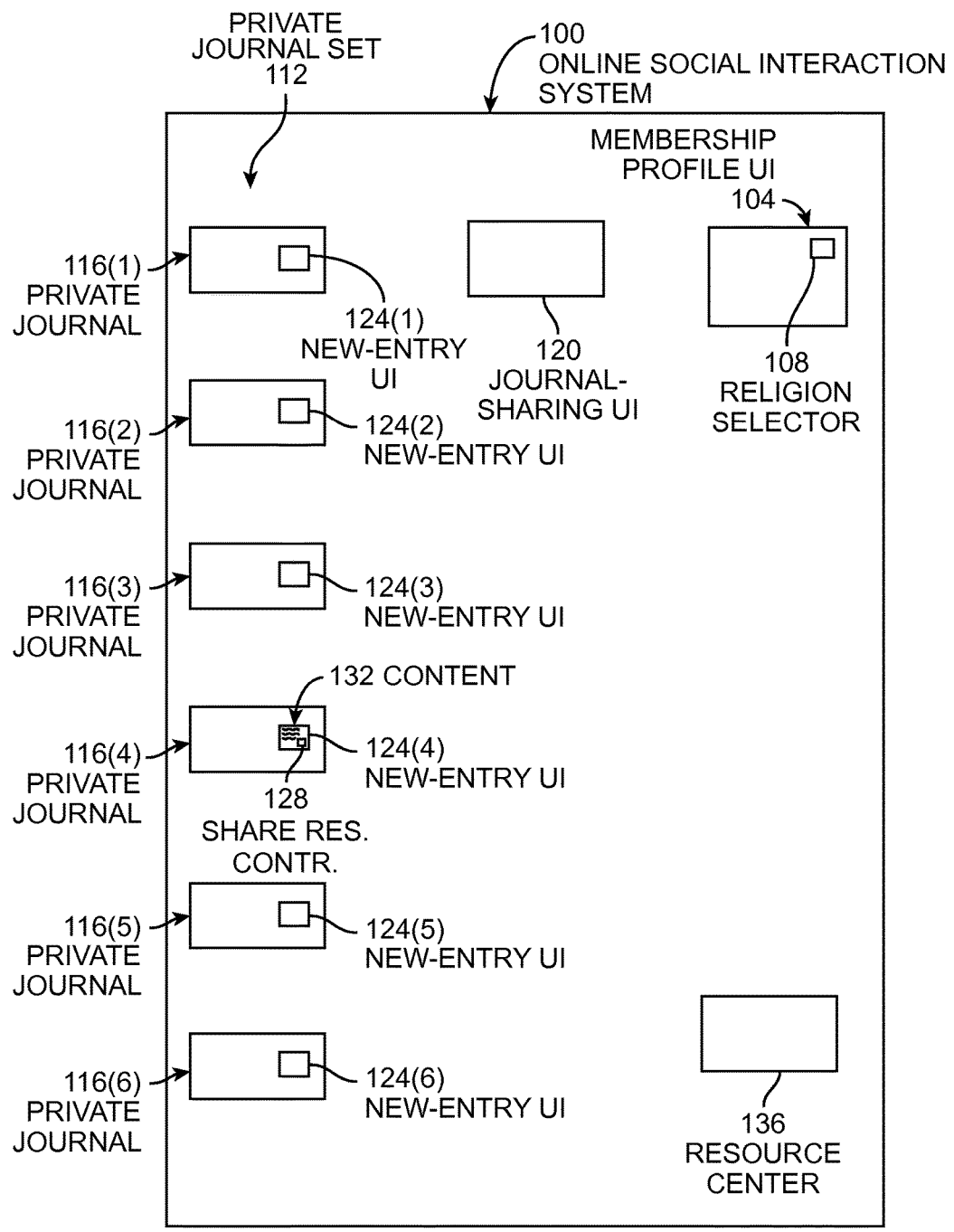
FIG. 1 is a high-level block diagram illustrating a multi-religion online social-interaction system of the present invention.

Referring now to the drawings, FIG. 1 illustrates an online social-interaction system 100 in which the theme is religion and various features and functionalities are directed to various religious practices of the members of the online social-interaction system. Of course, this example is only illustrative. As a non-religion example, the theme may be education, with the differing members being, for example, teachers of differing subjects (such as math, literature, science, writing, etc.) and/or differing grade levels, among others. After reading this entire disclosure, those skilled in the art will readily appreciate the variety of implementations that a online social-interaction system of the present invention, such as system 100 of FIG. 1, may have.

System 100 may include a membership-profile user interface (UI) 104 that allows a user to select which religion she/he wants to be identified with. This information need not be used for any purpose other than tracking membership and/or marketing. As an example, membership-profile UI 104 may include a religion selector 108 that the user uses to select their religion. Religion selector 108 may be any suitable selector, such as a drop-down menu, set of radio buttons, etc. In one alternative embodiment, the religion that the user selects via religion selector 108 becomes a "home community" for that user and the user becomes a member of that community only.

Each member of online social-interaction system 100 is provided with a set 112 of one or more private journals. For the sake of illustration, set 112 includes six private journal types, specifically, a Gratitude journal 116(1), a Prayer Request journal 116(2), a Prayers and Meditations journal 116(3), a Forgiveness and Healing journal 116(4), a Poems and Quotes journal 116(5), and an Every Step journal 116(6). When a new member first visits her/his private interface, online social-interaction system 100 provides all of private journals 116(1) to 116(6) as journals that are completely private to that member, meaning only that member can see journal entries/posts. In this embodiment, online social-interaction system 100 allows each member to share each of her/his journals with one or more other members of online social-interaction system 100. The sharing of one or more of private journals 116(1) to 116(6) and/or entries allows the sharing member to create one or more personal private-journal communities consisting of her-/himself and one or more other members of the online social-interaction system 100. In the embodiment shown, a journal-sharing UI 120 allows the member to keep one or more, or all, private journals 116(1) to 116(6) private (e.g., via a Just Me selector), to share one or more, or all, of the private journals with All Friends, and to share one or more, or all, of the private journals with Close Friends. In addition, or alternatively, each private journal 116(1) to 116(6) can be provided with a new-entry UI 124(1) to 124(6) that allows the user to make the selection of Just Me, Close Friends, or All Friends (with Just Me being the default) for each new entry she/he postsAll Friends.

Notably absent from this list of Just Me, Close Friends, and All Friends in the example is the ability to make a private journal either public, i.e., viewable by all members of online social-interaction system 100. This is so because this embodiment of online social-interaction system 100 is for creating highly controlled groups of All Friends and Close Friends, and thus, highly controlled personal private-journal communities. Regarding the distinction between All Friends and Close Friends, it will be appreciated that online social-interaction system 100 provides more intimate information of a particular member to members that she/he has designated as a Close Friend than it provides to a member that is only a member of the broader category of All Friends. For example, a member may wish to share Prayer Request journal 116(2) only with members that are Close Friends, rather than with members that she/he has put into the broader category of All Friends.

Generally, each private journal 116(1) to 116(6) allows the member to post her/his own entries. Entries to a private journal 116(1) to 116(6) may be any sort of entry appropriate to the type of journal at issue. For example, self-entries to Gratitude journal 116(1) may be statements, descriptions, and/or photos or other media content concerning things that the member is grateful for and/or why they are grateful for them. When a user shares Gratitude journal 116(1) with another member designated as a Close Friend or All Friends, that other member can see the member's self-entries (and other posters' entries) and post their own entries, such as responses to the self-entries, to that journal. In this manner, the member owning Gratitude journal 116(1) can not only share thoughts and expressions of gratefulness, but also learn from and/or be comforted by thoughts of other members that are Friends or Close Friends. Each of the remaining journals 116(2) to 116(6) can function in the same way as Gratitude journal, with only the subject matter differing among the various journals.

Figure 2:
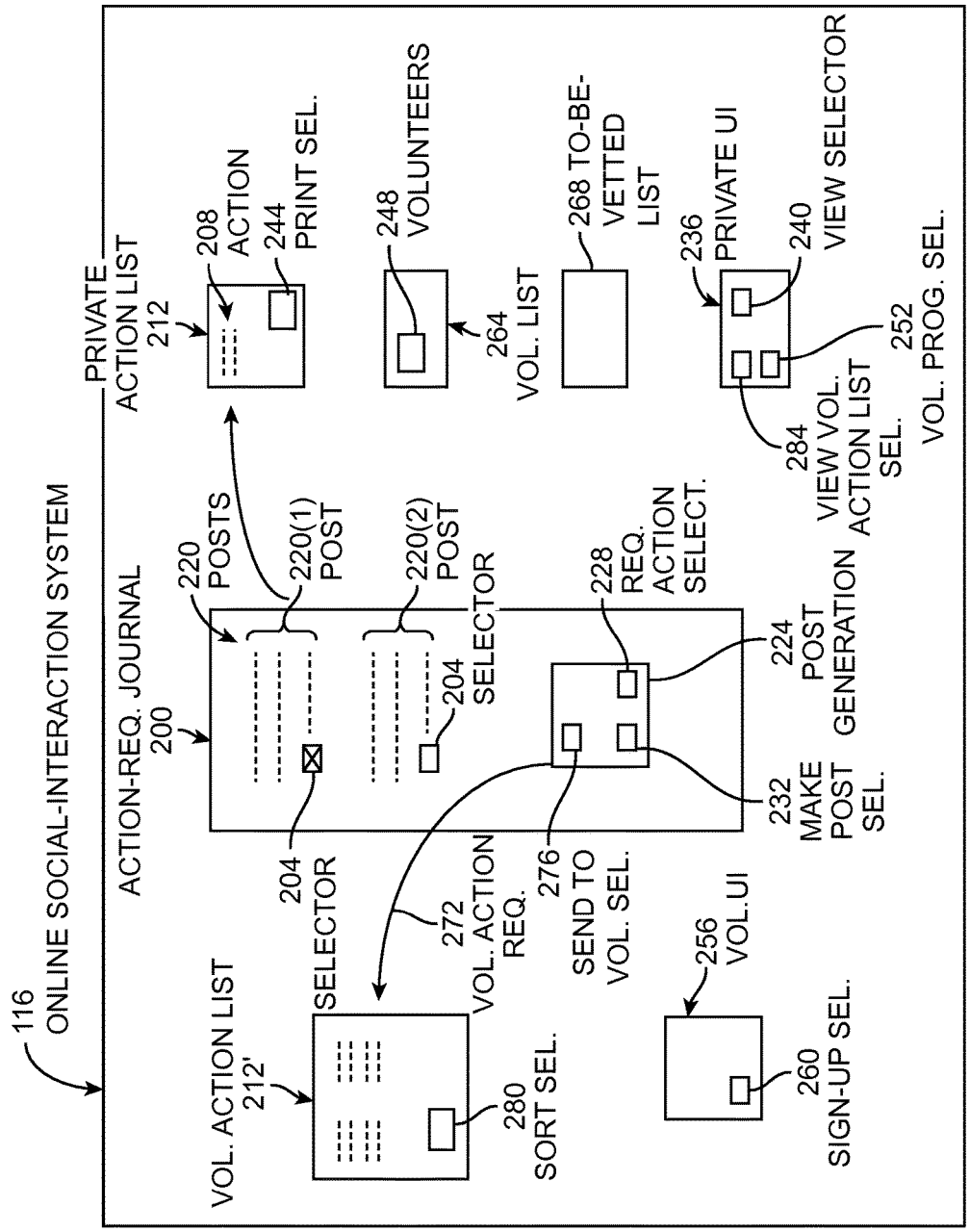
FIG. 2 is a high-level diagram illustrating an action-request journal and associated features and functionalities.

While each of Prayer Request journal 116(2) and Forgiveness and Healing journal 116(4) may work in the same manner as just described relative to Gratitude journal 116(1) and all of private journals 116(1) to 116(6) more generally, the Prayer Request and Forgiveness and Healing journals shown are each a specific type of journal referred to herein as an "action-request journal." FIG. 2 illustrates an exemplary operation of an action-request journal 200, such as a prayer-request journal like Prayer Request journal 116(2) and Forgiveness and Healing journal 116(4) of FIG. 1. Referring now to FIG. 2, action-request journal 200 may be a private journal having the basic posting and sharing functionality described above. In addition to those functionalities, action-request journal 200 also includes an add-to-action-list selector 204 that allows some or all of the members having access to the action-request journal to add an appropriate action, such as action 208, to their private action list 212. Private action list 212 is a list that each member can utilize to maintain a list of actions they commit to following up on. One way for a member to add a followup action to her/his private action list is to select add-to-action-list selector 204 in any action-request journal 200 she/he has access to, such as an action-request journal of a Close Friend, an All Friends, or her-/himself. The online social-interaction system presenting action-request journal 200, such as system 216 (which may be the same as or similar to online social-interaction system 100 of FIG. 1), may display add-to-action-list selector 204 proximate to each post 220 in the action-request journal. Alternatively, since some posts 220 may not be action requests but rather responses to action requests, the online social-interaction system at issue may provide a post generator 224 that includes a request-action selector 228, that, respectively, allow a member to make a post to action-request journal 200 and make any particular post an action-request post. When a member selects request-action selector 228 and then, for example, selects a make-post selector 232, the online social-interaction system then displays add-to-action-list selector 204 proximate to corresponding post 220, such as shown in FIG. 2 relative to each post 220(1) and 220(2).

When a member selection add-to-action-list selector 204, online social-interaction system 216 adds a followup action 208 to private action list 212, which contains a list of all non-dismissed followup actions that the member has committed to taking. In addition, online social-interaction system 216 may also notify the requesting member when another member has committed to performing the requested action. For example, online-social-interaction system 216 may make a sub-post to action-request journal 200 beneath the requesting post something to the effect that "Member X is taking the requested action." Alternatively, online social-interaction system 216 may send another type of message, such as an email, instant message, etc., to the requesting member of the same or similar content notifying the requesting member of the acceptance of the accepting member. Each member may gain access to her/his list in any one or more of a number of manners. For example, when online social-interaction system 216 provides each member with a private UI for interacting with the social-interaction system, such as private UI 236, the system may display a view-action-list selector 240 that the member may select to cause the system to display private action list 212 to the member. As those skilled in the art, online social-interaction system 216 may display private action list is any suitable manner, such as in a viewing pane on a currently active window or in a popup window, among others. Alternatively, online social-interaction system 216 may display private action list 212 continually in a dedicated viewing pane of a currently active window. Fundamentally, there are no limitations on how online social-interaction system may display private action list 212 to the owning member.

In some embodiments, online social-interaction system 216 may provide each member the ability to print her/his private action list 212, for example, to a hardcopy printer, portable-document-format (PDF) printer, or the like. For example, online social-interaction system 216 may provide private action list 212 with a print selector 244 that causes the social-interaction system 216 to print the private action list to a target printing device, such as a printing device that the user has selected. Provisions may be provided to allow the user to print private action list 212 in any of a variety of formats, such as title only, body only, and title and body, among others. Especially when printed in hardcopy form, when the member prints her/his private action list 212, she/he can do many things with it, such as post it to personal hardcopy message center at her/his home, post it on a refrigerator, place it on a nightstand, etc., as a reminder to follow up on the action requests she/he committed to.

In some embodiments, online social-interaction system 216 may include an action-followup volunteer program that allows members to become volunteers 248 that pre-commit to following up on action requests, such as action requests 220(1) and 220(2) of action-request journal 200. The action requests that each of volunteers 248 commit to following up on can come from the action-request journal of any member that the volunteer is a member of, even if that volunteer is not an All Friends or Close Friend of the member at issue. Online social-interaction system 216 may provide each member, for example, via its private UI 236, with a volunteer-program selector 252 that causes the social-interaction system to display a volunteer UI 256 that may explain the volunteer program and provide a sign-up selector 260 that allows the member to become a volunteer 248. In response to a member selecting sign-up selector 260 or in response to one or more member actions following selection of the sign-up selector, such as providing one or more solicited responses aimed at vetting the member, online social-interaction system 216 may either add the member to a volunteer list 264 or to a to-be-vetted list 268 used by one or more administrators of the social-interaction system as part of a volunteer approval process. Once a member has been made a volunteer 248 and added to volunteer list 264, each subsequent volunteer-action-request 272 gets added to her/his private action list 212.

In this connection, in addition to request-action selector 228, online social-interaction system 216 may provide post generator 224 with a send-to-volunteer selector 276 that a member can select to cause the social-interaction system to add a corresponding followup action 208 to the private action list 212 of each volunteer 248 on volunteer list 264. When a member becomes a volunteer 248, online social-interaction system 216 may enhance the functionality of that member's private action list 212. For example, online social-interaction system 216 may provide each volunteer's private action list 212' with a sort selector 280 that allows the volunteer to visually separate followup actions 208 based on whether the action came from a volunteer request or a non-volunteer request, such as from a Close Friend or an All Friends designee. Alternatively, online social-interaction system 216 may provide separate lists accessible from the same view-action-list selector 240 or accessible from differing selectors, such as view-action-list selector 240 and a view-volunteer-action-list selector 284. Those skilled in the art will understand that printing functionalities can be based on such separation/filtering so that a volunteer can separate her/his followup actions in hardcopy form as well.

Online social-interaction system 216 can be provided with additional and/or alternative functionalities as desired. For example, online social-interaction system 216 can be designed and configured to post a message to the requesting member's action-request journal 200 to the effect of "Your request has been sent to our action volunteers." Alternatively, to keep volunteer requests more private, online social-interaction system 216 may be designed and configured to send a similar sentiment by another means, such as email, instant message, or the like. As another example, when a requesting user selects send-to-volunteer selector 276, instead of followup actions 208 instantly being posted to volunteers' private action lists 212, the request may go to a participant in the volunteer program that is designated to receive action requests and assign them to some or all of the volunteers 248.

In addition to the unique features of private action-request journals, private journals of the present invention can be enhanced in other ways. For example, some or all of the private journals provided can include some or all of the posting and sharing functionalities described above and further include functionality for designating certain posts for inclusion in a resource center that the online social-interaction system maintains. In some embodiments of online social-interaction system 100, a system administrator may be responsible for maintaining the resource center, including providing content. In other embodiments, a system administrator may provide some content with members providing other content. In still other embodiments, if a system administrator is used, they may just monitor content provided by others. As an example that involves resource-center functionality, in the religion-themed example of FIG. 1, Forgiveness and Healing journal 116(4) may be provided with functionality that allows a member that posts the journal to make a resource cited in a particular post to the journal available to more than the members she/he has elected to share the Forgiveness and Healing journal with as Close Friends and/or All Friends or all members of online social-interaction system 100. For example, online social-interaction system 100 may provide new-entry UI 124(4) of Forgiveness and Healing journal 116(4) that includes a share-resource control 128 that, when selected by the posting member, causes the social-interaction system to share any resource(s) cited in the content 132 of the post with all members of the social-interaction system, essentially making each such post public. For example, in response to a user using share-resource control 128, online social-interaction system 100 may post content 132 to a shared resource center 136 available to all members of the online social-interaction system. Depending on how online social-interaction system 100 is configured, the online social-interaction system may provide share-resource control 128 and corresponding functionality, for example, only to the owner of Forgiveness and Healing journal 116(4) at issue, to the owner and members that are Close Friends, or to the owner and members that are either Close Friends or All Friends. Examples of resources include, but are not limited to, hyperlinks to books, booksellers, published articles, educational videos, motivational audio, etc. Those skilled in the art will readily understand the vast array of things that may be considered a resource, not only for Forgiveness and Healing journal 116(4), but also for any other private journal provided with this sharing functionality. In this connection, this resource-sharing functionality can be provided to a private journal of any type.

Relatedly, share-resource control 128 may work in reverse of that described. That is, online social-interaction system 100 may be designed and configured so that a member uses share-resource control 128 to add a link to a new entry that links to a particular resource (not shown) with resource center 136 or even the resource center itself. In this way, the posting member can make it easy for another member to view the linked resource or at least navigate to resource center 136.

Figure 3:
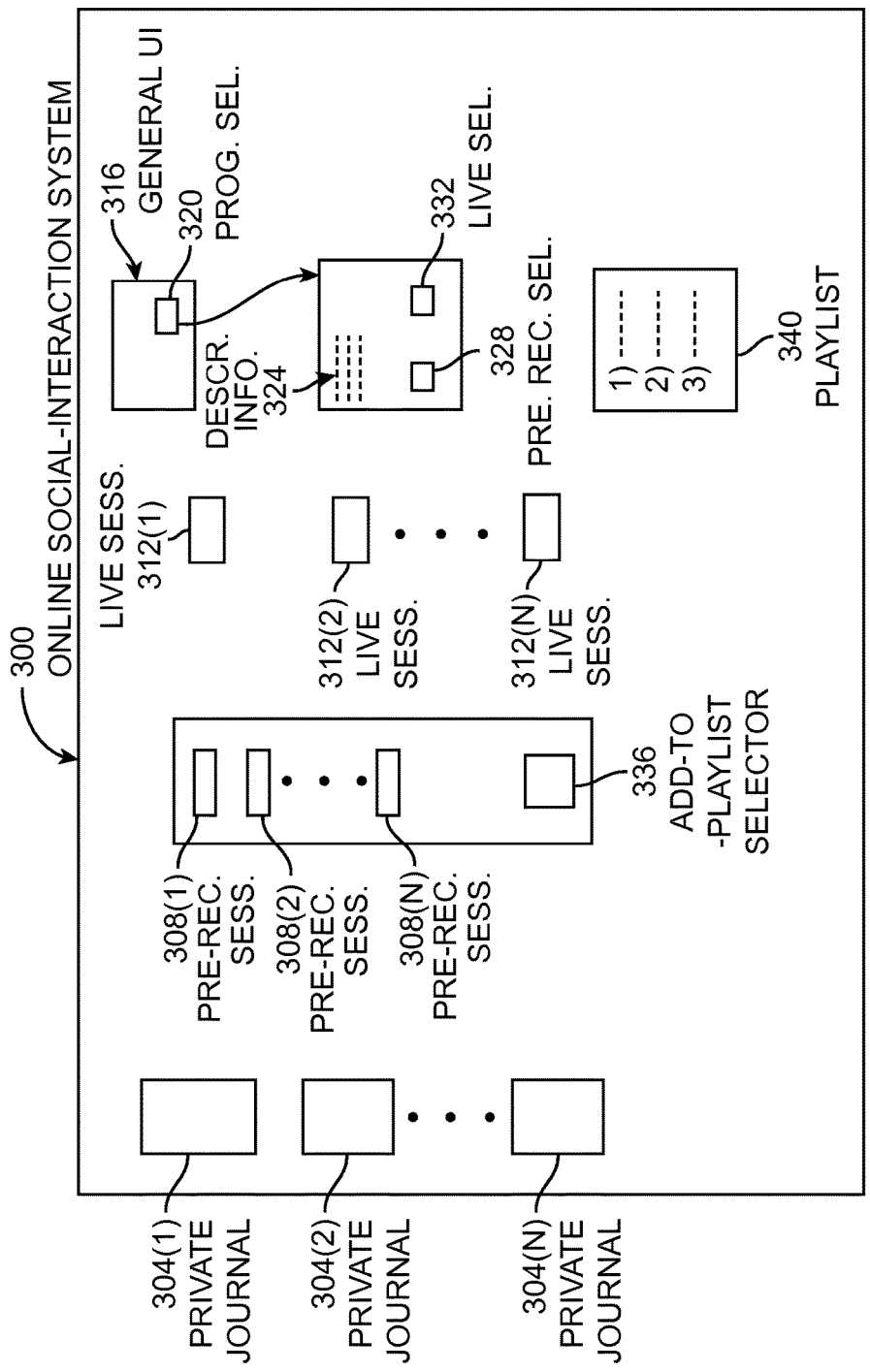
FIG. 3 is a high-level diagram illustrating an online social-interaction system that includes online meditation features and functionalities.

In addition to any one or more of the functionalities described above, an online social-interaction system of the present invention may include mindfulness functionalities, including functionalities for allowing each member to learn about and/or participate in one or more types of meditation sessions made available by the online social-interaction system. FIG. 3 illustrates a set of meditation functionalities that can be provided to an online social-interaction system 300 of the present disclosure, which may be the same as or similar to online social-interaction system 100 of FIG. 1. Referring to FIG. 3, in addition to providing one or more private journals 304(1) to 304(N), online social-interaction system 300 may include a meditation program that allows any of the members to participate in one or more online meditation sessions, each of which may be either a prerecorded session 308(1) to 308(N) or a live session 312(1) to 312(N). In one embodiment, online social-interaction system 300 may provide each member with a general UI 316 that allows that member to utilize functionalities and features of the social-interaction system and may include a meditation-program selector 320. In this embodiment, in response to the member selecting meditation-program selector 320, online social-interaction system 300 presents the member with descriptive information 324 about the meditation program provided, as well as a prerecorded-session selector 328 and a live-session selector 332, which may or may not be presented on the same viewing page as the descriptive information.

In one example, when the member selects prerecorded-session selector 328, online social-interaction system 300 may display the set of prerecorded meditation selections 308(1) to 308(N) from which the member may choose to "participate" in by listening to and/or watching the selected prerecorded session. As those skilled in the art will readily understand, prerecorded meditation selections 308(1) to 308(N) may be categorized and/or searchable by any one or more attributes, such as running time of the session, type of session, leader, etc. In one embodiment, when the member selects one of prerecorded meditation selections 308(1) to 308(N), online social-interaction system 300 may begin presenting the corresponding prerecorded session to the member. In some alternative embodiments, after the member has selected one or more of prerecorded meditation selections 308(1) to 308(N) and actuated an add-to-playlist selector 336, online social-interaction system 300 may add the corresponding prerecorded session(s) the member's meditation playlist 340 for the member to access as desired.

In an example wherein the member selects live-session selector 332, online social-interaction system 300 may display the set of live meditation selections 312(1) to 312(N) from which the member may choose to "participate" in by listening to and/or watching the selected live session. As those skilled in the art will readily understand, live meditation selections 312(1) to 312(N) may be categorized and/or searchable by any one or more attributes, such as start time, running time of the session, type of session, leader, etc. In one embodiment, when the member selects one of live meditation selections 312(1) to 312(N) and that session is in progress or is about to start, online social-interaction system 300 may begin presenting the corresponding session to the member. In some embodiments, if the member has selected one or more of live meditation selections 312(1) to 312(N) that will be held in the future, online social-interaction system 300 may add the corresponding prerecorded session(s) the member's meditation playlist 340 and/or provide the member with one or more reminders, such as via instant messaging or other messaging feature, that she/he has chosen to participate in such live meditation session(s).

As noted above, a feature of some alternative embodiments of an online social-interaction system of the present invention is the intentional separation of the communities relative to the ability of members of any one community to interact via the online social-interaction system with members of any other community(ies) that is/are provided by the online social-interaction system. Some embodiments of a multi-community online social-interaction system of the present invention are designed from their inception to restrict the ability of members of the differing online communities supported by the online social-interaction system to interact with one another via the online social-interaction system. That said, the present inventors recognize that it can be highly desirable to allow members of one online community to have some access to other online communities, especially to promote learning about the beliefs, practices, etc. of the other communities. Greater understanding of the underpinnings of other communities, such as religious communities, can lead to greater tolerance and harmony.

Figure 4:
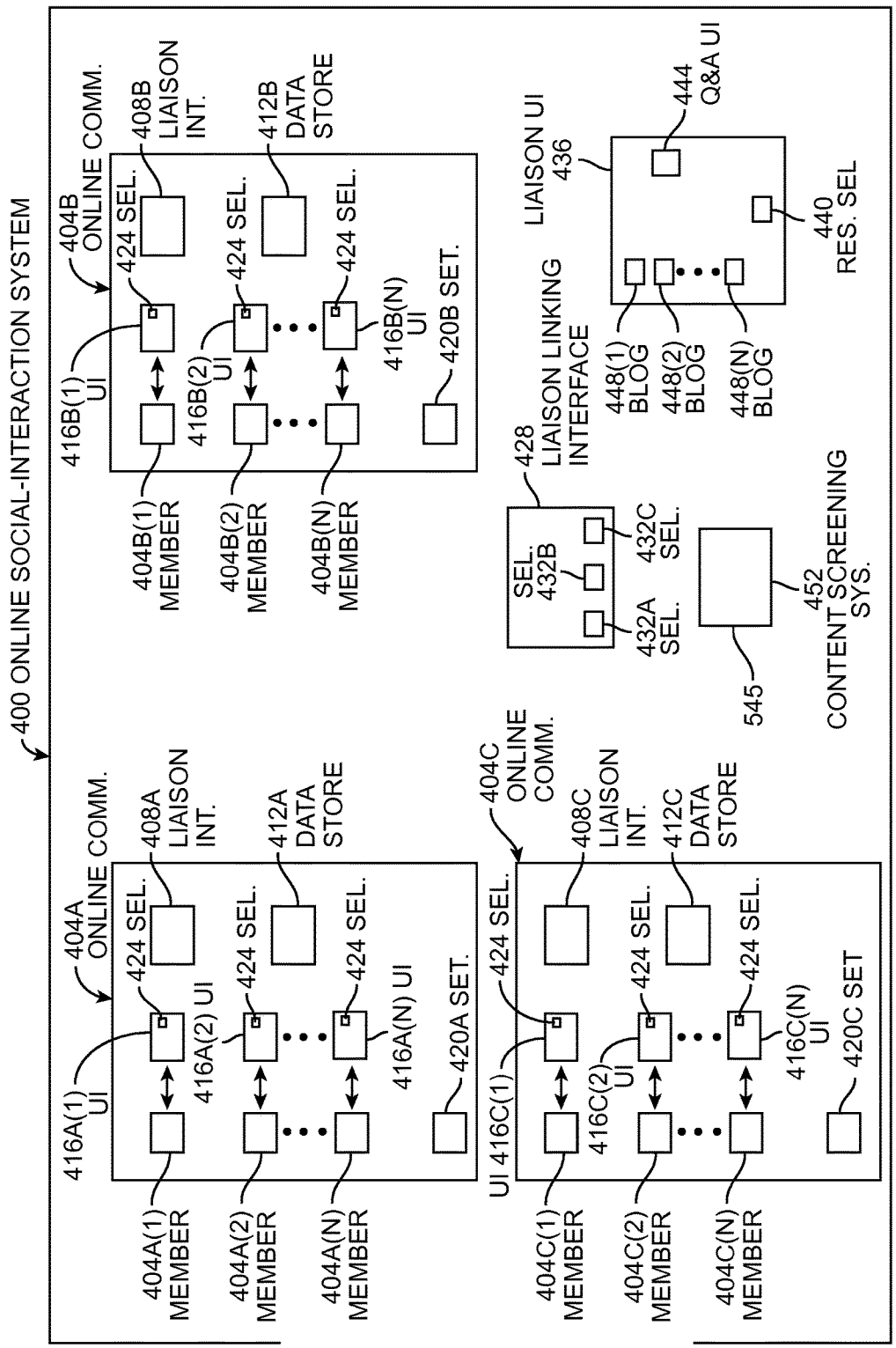
FIG. 4 is a high-level diagram illustrating a multi-religion online social-interaction system providing a plurality of online communities that each include a liaison interface for promoting inter-community learning among the online communities provided.

In this connection, FIG. 4 illustrates an exemplary multi-community online social-interaction system 400 of the present invention that provides multiple online communities, here three online communities 404A to 404C, having corresponding respective sets of members 404A(1) to 404A(N), 404B(1) to 404B(N), and 404C(1) to 404C(N). Importantly, online social-interaction system 400 only allows the members 404A(1) to 404A(N), 404B(1) to 404B(N), and 404C(1) to 404C(N) of each online community to only associate, for example, by All Friendsing, Close Friending, etc., with other members of their home community, and not members of any non-community. However, to promote inter-community learning so that members 404A(1) to 404A(N), 404B(1) to 404B(N), and 404C(1) to 404C(N) of one online community 404A to 404C can learn about beliefs, practices, tenets, knowledge, etc., of one or more of the other online communities, online social-interaction system provides each online community, or "hosting community," with a corresponding liaison interface 408A to 408C through which members of other online communities may gain controlled access to the hosting community.

For example, each online community 404A to 404C may have its own learning/resource datastore 412A to 412C containing any one or more of a variety of things, such as publications, videos, audios, presentations, etc., for use by members of the home community and/or specifically posted for use by members of other (non-home) online communities, and each liaison interface 408A to 408C may provide access to the corresponding datastore. In one embodiment, online social-interaction system 400 provides each member 404A(1) to 404A(N), 404B(1) to 404B(N), and 404C(1) to 404C(N) with a private UI 416A(1) to 416A(N), 416B(1) to 416B(N), and 416C(1) to 416C(N) that is customized according to the corresponding online community 404A to 404C. Each online community 404A to 404C may have a corresponding set 420A to 420C of one or more private journals types, the journals (not shown) of which may have any of the functionalities of the private journals described above. Consequently, the community-centric customization of private UIs 416A(1) to 416A(N), 416B(1) to 416B(N), and 416C(1) to 416C(N) may include the providing of differing journal types. Customization may also include customizing the graphics (not shown) of private UIs 416A(1) to 416A(N), 416B(1) to 416B(N), and 416C(1) to 416C(N) as between differing online communities 404A to 404C.

In one embodiment, online social-interaction system 400 provides each private UI 416A(1) to 416A(N), 416B(1) to 416B(N), and 416C(1) to 416C(N) with a learn-more-about-other-communities selector 424 that, upon selection by the corresponding member 404A(1) to 404A(N), 404B(1) to 404B(N), and 404C(1) to 404C(N), causes the online social-interaction system to display a liaison-interface linking interface 428 that allows the user to select which non-home community 404A to 404C and corresponding liaison interface 408A to 408C to link to. The exemplary liaison-interface linking interface 428 shown is for a religion-themed multi-community online social-interact system, wherein a plurality of selectors 432A to 432C are provided to allow the member to navigate to the corresponding liaison interface 408A to 408C. Upon member-selection of one of selectors 432A to 432C, online social-interaction system 400 presents the user with a liaison UI 436 that allows that user to interact with the corresponding liaison interface 408A to 408C.

As alluded to above, in one example liaison UI 436 may include a resource selector 440 that, upon member selection, navigates the member to the resource datastore 412A to 412C of the corresponding non-home community. Liaison UI 436 may be provided with additional/alternative functionalities. For example, liaison UI 436 may be provided with a question-and-answer UI 444 that allows the visiting member to ask one or more questions of one or more members of the hosting online community 404A to 404C. Each answering member may be a member of the hosting online community that has volunteered to participate in a person-to-person liaison program for promoting inter-community interaction. As another example, liaison UI 436 may provide one or more liaison blogs 448(1) to 448(N) that each allow the visiting member to establish associations (e.g., Friend-like associations) with members of the hosting online community 404A to 404C. Each liaison blog 448(1) to 448(N) may have some similarities with the private journals described above, such as being directed to a specific topic (e.g., religious practice, educational subject, etc.), the ability to "Friend" members of the hosting online community 404A to 404C, and the ability for the visiting member and "Friended" member(s) of the hosting community to engage in a dialog to allow the visiting member to learn from the member(s) of the hosting community, and vice versa. In some embodiments, online social-interaction system 400 may allow the visiting member initiating a particular instantiation of any liaison blog 448(1) to 448(N) to ask members of her/his home community to join the liaison blog to further promote inter-community learning, awareness, and tolerance. It is noted that in some embodiments, online social-interaction system 400 may provide a content-screening system 452 that screens the content of any blogging posts and/or messages traversing each liaison interface 408A to 408C to ensure that the content remains civil and respectfully. Content-screening system 452 may be executed by suitable screening software and/or one or more human screeners.

While the foregoing description illustrates features and functionalities of online social-interaction systems of the present disclosure in largely general terms, following is a detailed example of an online social-interaction system that is executed with a religious theme. For the sake of convenience and unless noted otherwise, the underlying online social-interaction system (not shown) is represented by a series of screenshots illustrating a particular instantiation of a UI for the online social-interaction system. For the sake of not having to needlessly repeat details already described, unless any statements below are contrary to the features and functionalities described above, the online social-interaction system underlying the following screenshots can be provided by any of the online social-interaction systems described above, such as online social-interaction system 100, 216, 300, and 400 of FIGS. 1-4, respectively.

In this example, individuals from any religions background are welcome to join the social-interaction system. In addition, groups such as churches, monasteries, mosques, temples, sanghas, and any other spiritual center worldwide are welcome to join, as are spiritual teachers and lecturers and spiritual public figures, bands, artists, businesses, communities, and stores offering spiritual books and materials are allowed to join, though in some embodiments membership may require approval by an administrator in order to ensure that the motives of any potential member are consistent with the theme of the online social-interaction system. To join, each individual or entity may identify her/his/its religious affiliation via a suitable membership profile online form. In the multi-community alternative embodiments described above in connection with FIG. 4, the online social-interaction system makes that individual/entity a member of the corresponding one of online communities, as described above. This is not so for the primary embodiments that are similar to online social-interaction system 100 of FIG. 1, which makes no distinction based on religious affiliation.

The online social-interaction system of this example allows individual members to create their own private spiritual communities by introducing the online social-interaction system to their friends and families so that they may share and garner support for their spiritual practices. As noted above, the online-social-interaction system protects privacy by making all of the private journals of each member private from the outset, with the option of selectively sharing with other members of the online social-interaction system to create personal private-journal communities using the Close Friends and Friends options as described above. In addition, each member can keep posts private by using the Just Me option. In addition, members can create and/or join Groups to allows them to create and/or join, for example, personal online prayer groups, prayer meetings, scripture and religious studies, meditation sessions, 12-step programs, and support groups. Members and spiritual communities can use the online social-interaction system to announce and obtain support for spiritual events. Spiritual communities online via the online social-interaction system may garner wider support for prayer requests that is wider than their own spiritual community. Online social-interaction system allows members to stay in touch and be involved with their wider spiritual communities, for example, church, prayer group, etc., all the time. This serves also to as a support when members are unable to attend their local regular services and spiritual events. Individual members, too, can use the online social-interaction system to announce and receive support for their own spiritual events.

The online social-interaction system can enable scholars to promote understanding and tolerance of world religions by offering a learn-more-about-world-religion option. This option may provide scholarly writings, educational materials, lectures, and links for enabling members to learn more about the world's diverse religions and discover the underlying unity of all great religions. A purpose of this option is to promote understanding and tolerance among differing religious sects by extinguishing some of the ignorance that is often the foundation for discrimination. For example, the online social-interaction system may: provide links to articles and teachings by respected teachers from different religions and sects within religions; may provide histories of all religions, explaining the fundamental beliefs and how they originated; and may allow guest authors and lecturers to contribute and offer insights into the practices and beliefs of the religion they practice, among other things. Some or all of this functionality may be made available, for example, via a selector similar to learn-more-about-other-communities selector 424 of FIG. 4, a shared resource center, such as shared resource centers 142 and 142' of FIG. 1, and/or liaison interfaces similar to liaison interfaces 408A to 408C, of FIG. 4.

Figure 5:
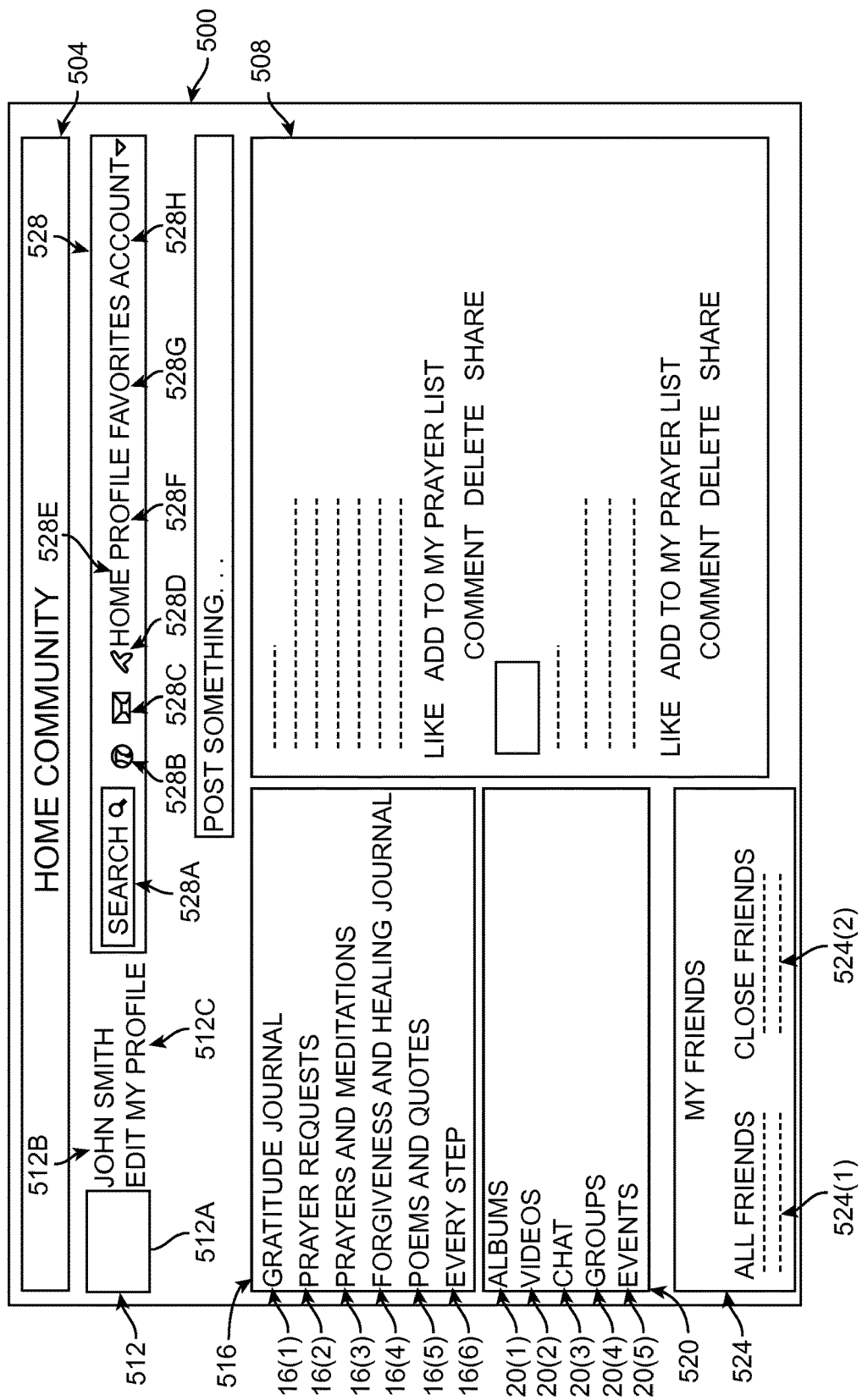
FIG. 5 is a screenshot of a home page of a multi-religion online social-interaction system.

Referring now to FIG. 5, this figures illustrates a home page 500 that is private to a particular user that is a member of the online social-interaction system. Home page 500 is provided as part of the private UI that allows the user to interact with and utilize the online social-interaction system. In this example, home page 500 includes, among other things, a banner region 504, a feed region 508, an edit-profile region 512, a journal region 516, a utilities-pane region 520, a My-Friends region 524, and a utilities-bar region 528, each of which is described below in detail.

In this example, banner region 504 may display, for example, the name of the online social-interaction system. Feed region 508 displays posts that the user has made, as well as posts made my Close Friends and All Friends, which are members that the user has asked to be associated with the user and have elected to accept the corresponding Close Friend or All Friends invitation (not shown). The posts displayed in feed region 508 may be posts from private journals, groups, and events (see below), among other locations. Edit-profile region 512 displays a graphic 512A and moniker 512B each selected by the user, as well as a link 512C that navigates the user to her/his profile page (not shown) when the user selects the link. Journal region 516 includes six private-journal links 516(1) to 516(6) to, respectively, six differing private journals, namely: a Gratitude Journal for sharing blessings and feeling of gratitude; a Prayer Requests journal for sharing an receiving support for prayer requests and offerings; a Prayers and Meditations journal for sharing beloved prayers and meditations; a Forgiveness and Healing Journal for sharing experiences and receive support on the journey of forgiveness, transformation, and healing; a Poems and Quotes journal for sharing special poems and quotes with friends; and an Every Step journal for sharing experiences of incorporating spiritual practices into your everyday life. These private journals behave as described above relative to FIGS. 1-4. In this embodiment, each of the Prayer Requests and Forgiveness and Healing journals utilizes the action-request and followup volunteer functionalities and features described above relative to FIG. 2, such that the action requests noted above are prayer requests herein, and the followup volunteers are prayer volunteers.

Utilities-pane region 520 includes five utility links 520(1) to 520(5) to, respectively, five differing utilities, namely: an Albums utility for storing and containing albums, such as photo and other media albums; a Videos utility for storing and containing videos; a Chat utility that allows the user to chat with one or more other members; a Groups utility that allows the user to manage and interact with any groups that the user has created and/or joined; and an Events utility that allows the user to manage and interact with any Events that the user has created and/or joined. It is noted that in the present example the Albums utility has special functionality that automatedly groups photos/media according to the private journal with which they are associated. My-Friends region 524 allows the user to see lists 524(1) and 524(2) of, respectively, All Friends and Close Friends, such as by member photo/graphic and/or member name.

Utilities bar 528 includes a search control 528A, a global-messages link/notifier 528B, an email link 528C, a prayer-list link 528D, a Home link 528E, a Profile link 528F, a Favorites link 528G, and an Account dropdown control 528H. Search control 528A allows a user to search the content of feed region 508. Global-messages link/notifying 528B links the user to a messages page that allows the user to manage messages she/he has received, including All Friends and Close-Friend invitations and shows how many new/unresponded-to messages are pending. Email link 528C links the user to an email UI that allows a user to compose, send, and manage email. Prayer-list link 528D links the user to a prayer list UI that allows the user to see, manage, print, etc., her/his prayer list(s) (see action list 212 of FIG. 2, above). Home link 528E links the user to her/his home page of his private UI. Profile link 528F links the user to a profile UI that allows the user to manage her/his profile. Favorites link 528G links the user to a favorites UI that allows the user to view and manage the items she/he has designated as a favorite. Account dropdown menu 528H allows the user to manage aspects of her/his account.

Figure 6:
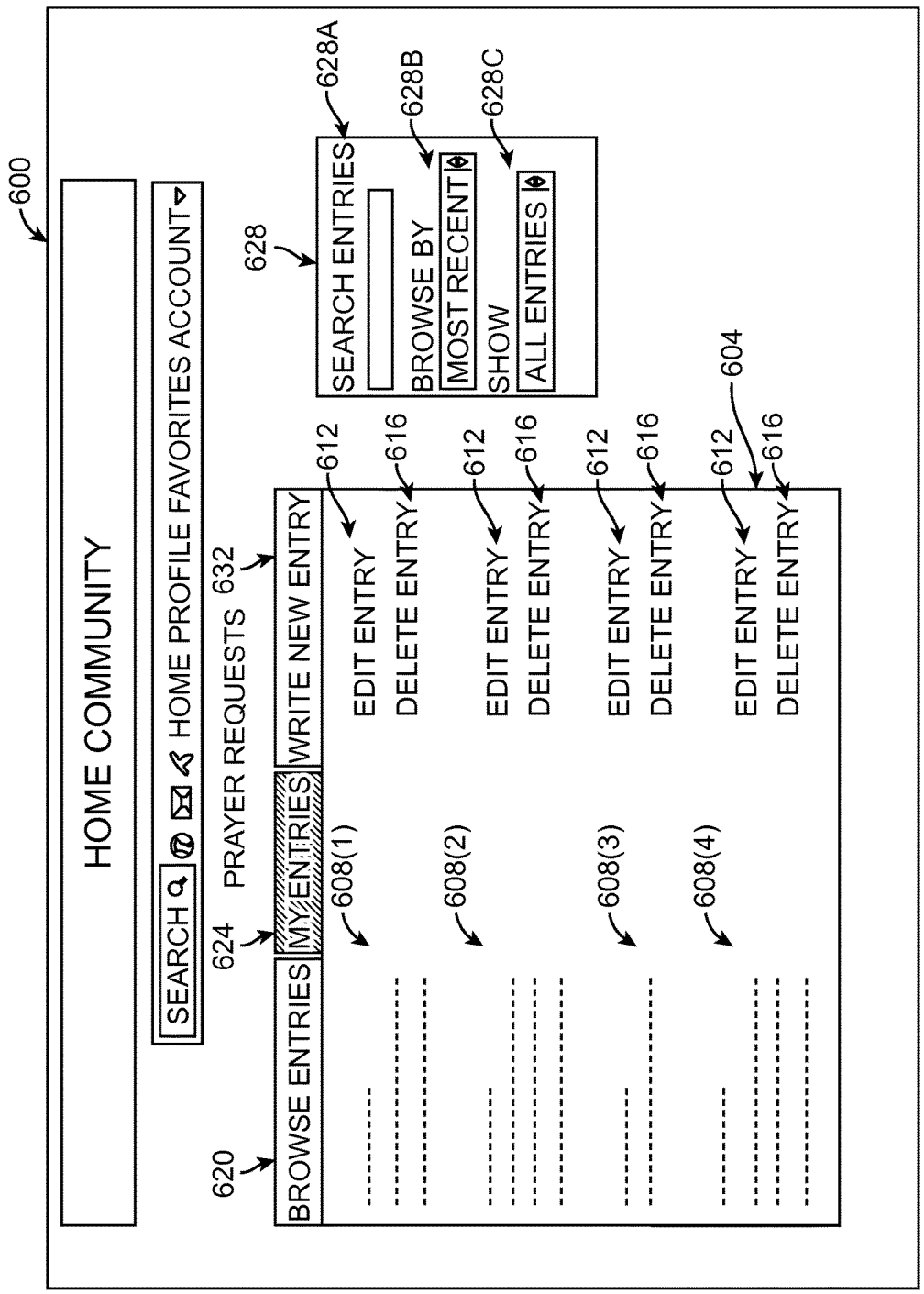
FIG. 6 is a screenshot of a private-journal page of the multi-religion online social-interaction system of FIG. 5.

FIG. 6 illustrates a private-journal page 600, here for the Prayer Requests journal, that the online social-interaction system may present to the user once the user selects, for example, private-journal link 516(1) from journal region 516 of home page 500 of FIG. 5 or other page provided by the social-interaction system. In the example of FIG. 6, private-journal page 600 includes a post-display region 604 where the online social-interaction system displays posts associated with the journal, again, here, the Prayer Request journal. In this example, the online social-interaction system provides each post displayed, here posts 608(1) to 608(4), with a corresponding Edit Entry selector 612 and a corresponding Delete Entry selector 616 that provide the user with editing and deleting functionality relative to the corresponding post. The user can control which posts the online social-interaction system displays in post-display region 604 by selecting one or the other of a Browse Entries control 620 and a My Entries control 624. When the user selects Browse Entries control 620, the online social-interaction system displays all of the posts of the corresponding private journal to the user in post-display region. When the user selects My Entries control 624, the online social-interaction system displays only the private-journal entries made by the user her-/himself. In either case, the user can use any of a set 628 of display controls 628A to 628C to control exactly what the online social-interaction system displays in post-display region 604. In this example, control 628A allows the user to search the entries in the private journal, control 628B allows the user to control how to browse the contents of the private journal, such as by reverse-chronological order, chronological order, alphabetically, etc., and control 628C allows the user to control which private-journal entries to post, such as published or draft. Those skilled in the art will readily appreciate that in the example of published and draft just mentioned, display control 628C may be provided only when the user selects My Entries control 624, especially if draft are only displayable when the user has selected the My Entries control. Private-journal page 600 also includes a Write New Entry control 632 that, when a user selects it, causes the online social-interaction system to display a Write New Entry UI in post-display region 604.

Figure 7:
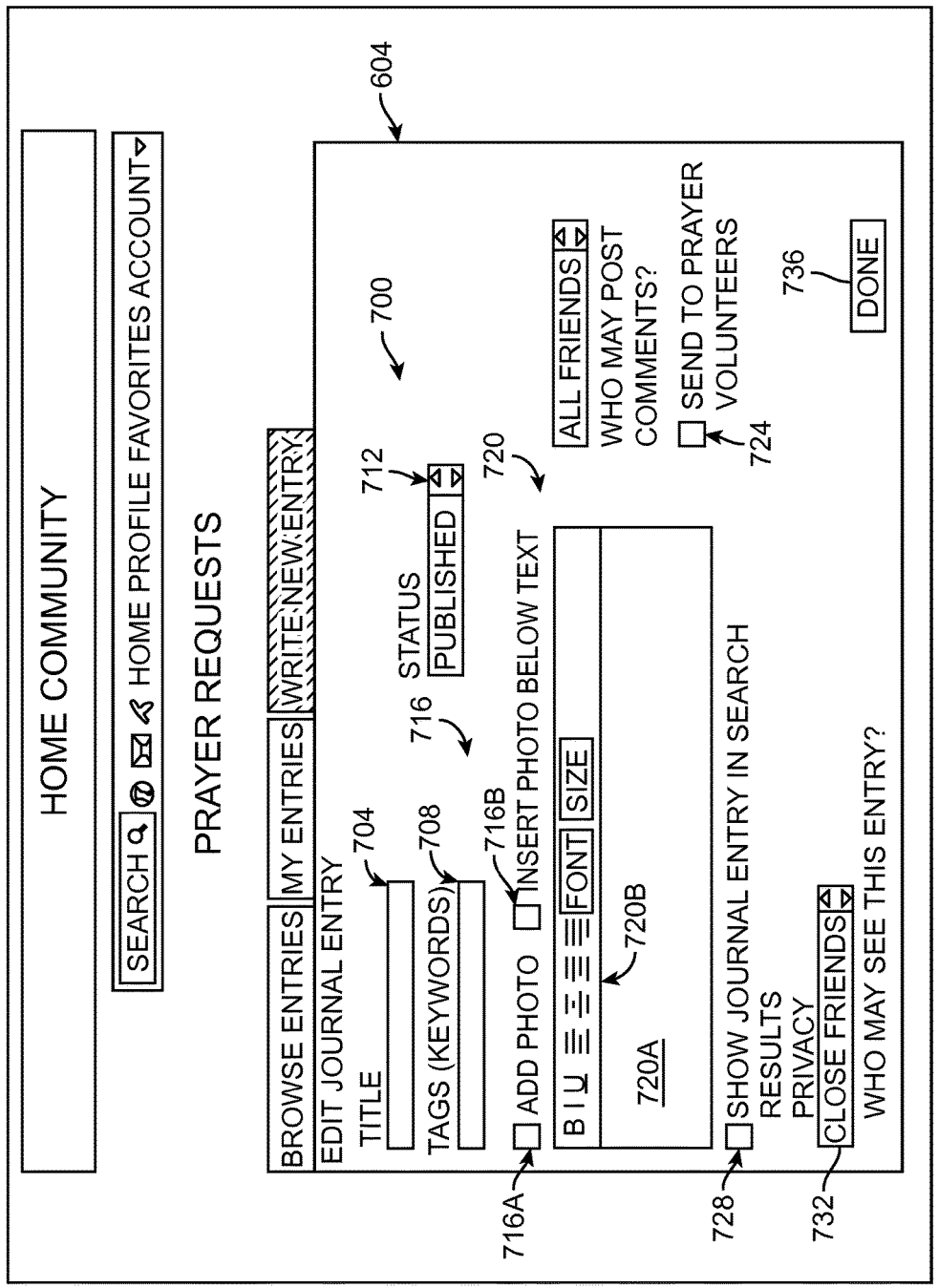
FIG. 7 is a screenshot of the private-journal page of FIG. 6, showing the post-display region containing a Write New Entry user interface.

FIG. 7 illustrates private-journal page 600 of FIG. 6 with post-display region 604 containing an exemplary Write New Entry UI 700 that allows the user to create a new post for the corresponding private journal, again, here, the Prayer Requests journal. In this example, UI 700 includes a title field 704, a tags field 708, a status selector 712, a photo-control region 716, a post-body editor 720, a prayer-volunteer-program selector 724, a search control 728, and a comment control 732, each of which is described below. Title field 704 allows the user to provide the post with a suitable title. Tags field 708 allows the user to provide one or more keywords relating to the post. Each keyword can be useful, for example, in facilitating searching functionality. Status selector 712 allows the user to designate the post as either "Draft" or "Published." If designated "Draft," the online social-interaction system does not make the post available to anyone else, such as All Friends and Close Friends. Photo-control region 716 allows the user to include a photo with the post via an Add-Photo tool selector 716A and to control the location of the photo in the pose via a photo-location selector 716B. In the present example, the default position for a photo is to the left of the post, but here the user can select to display the photo at the end of the post.

Post-body editor 720 includes a text field 720A where the user enters the desired text and a set 720B of word-processing tool selectors. Prayer-volunteer-program selector 724 allows the user to designate the current post to be sent to the volunteer prayer request program provided by the online social-interaction system. If the user selects prayer-volunteer-program selector 724, when the user is done creating a publishable post and selects a Done selector 736, the online social-interaction system sends the post to the prayer volunteer program for follow up by one or more prayer volunteers and/or a prayer volunteer program administrator in any of the manners described above. It is noted that in this exemplary embodiment, prayer-volunteer-program selector 724 is available only in the Prayer Request journal. Other private journals, such as the Gratitude Journal, Poems and Quotes journal, but with the exception of the Forgiveness and Healing journal, have all other features and functionalities described relative to the Prayer Requests journal with addition to a Like option and a Favorites option. Search control 728 allows the user to set who can see the private-journal post, such as All Friends, Close Friends, or Just Me. Comment control 732 allows the user to set who can comment on the private-journal post, such as All Friends, Close Friends, or Just Me. It is noted that when the user selects Edit Entry selector 612 of FIG. 6 for any displayed post, the online social-interaction system may display a UI that is the same as or similar to New Entry UI 700, except that it may have a different name (e.g., "Edit Entry" versus "New Entry") and the various entry fields and selectors may already be populated and set based on the original post. With the Edit Entry UI, the user can change that original post as desired.

Figure 8:
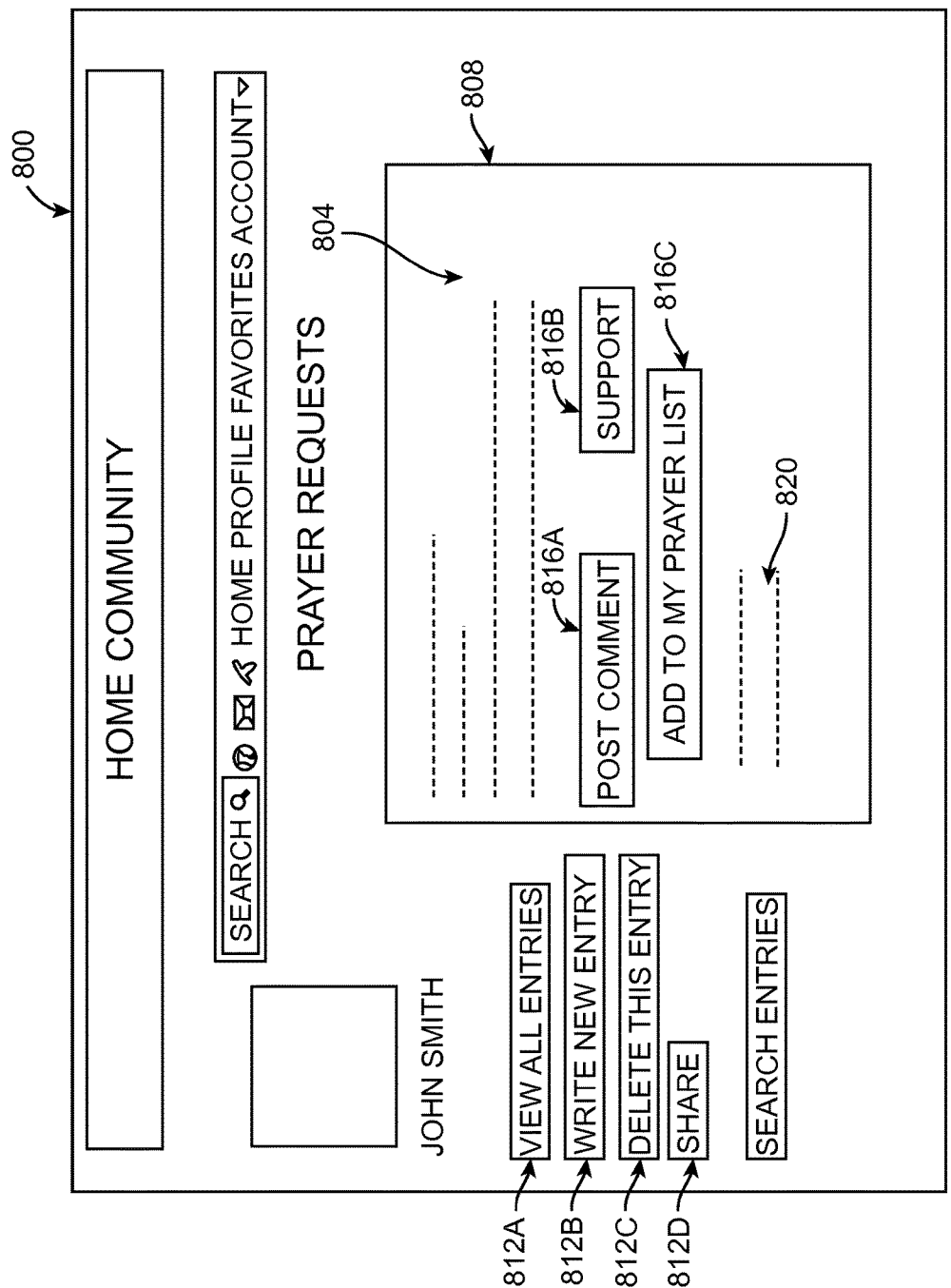
FIG. 8 is a screenshot of a post-display page of the multi-religion online social-interaction system, illustrating the page when the displayed post is the user's own post.
Figure 9:
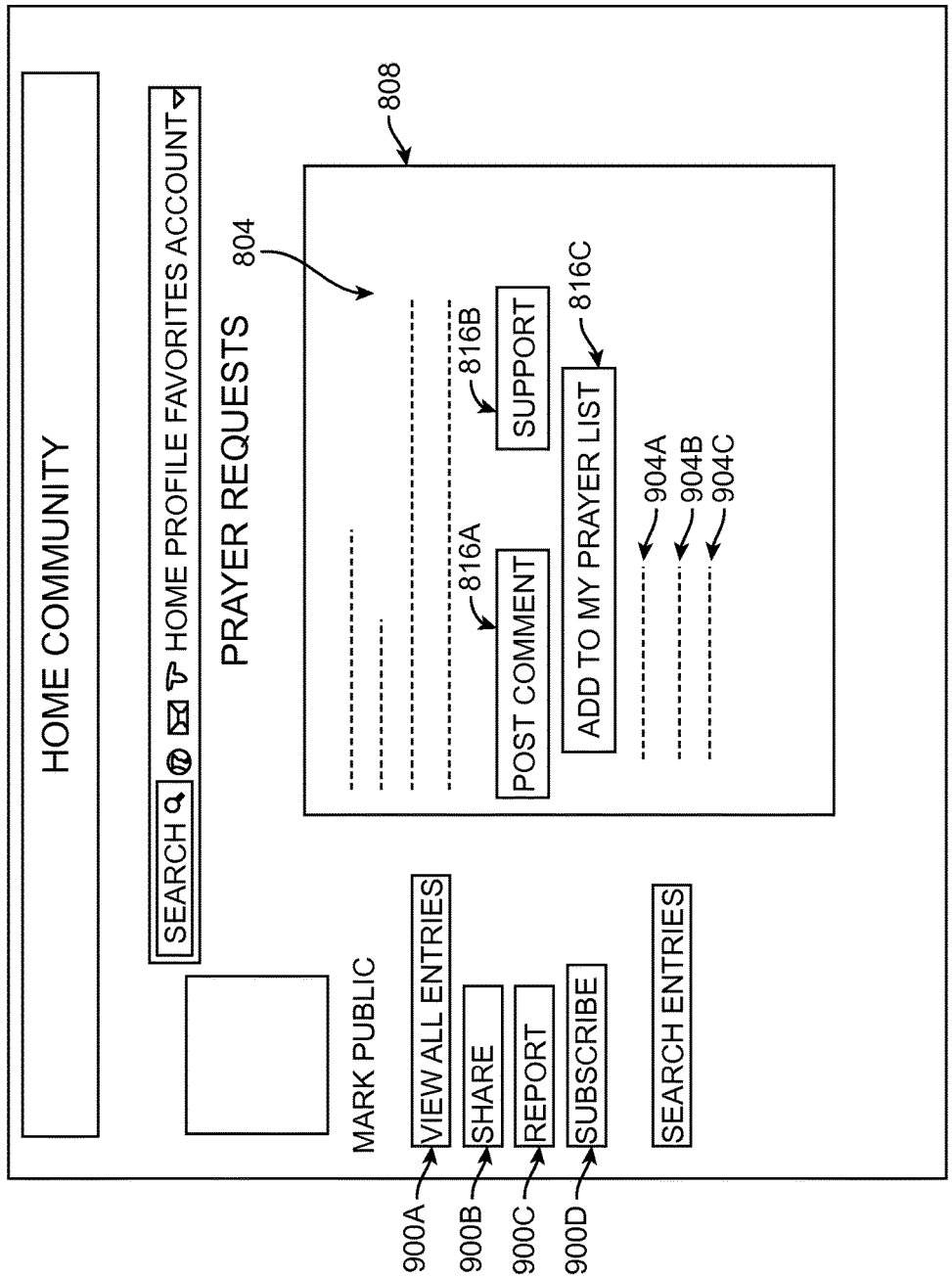
FIG. 9 is a screenshot of the post-display page of FIG. 8, illustrating the page with the displayed post is a post by another member.

Each user can view any private-journal post that they are privy to in any of a variety of ways. For example, a user may view a particular post by selecting it in post-display region 604 of FIG. 6. In one embodiment, when a user selects to view a particular post, the online social-interaction system may display post-display page 800 of FIG. 8. In the example of FIG. 8, the post 804 displayed in post-display region 808 is one of the user's own posts. Who displayed post 804 belongs to is important as differing features and functionalities are provided as between a user's own posts and posts of others. Here, with post 804 being the user's own post, the online social-interaction system displays a number of sidebar controls, here a View All Entries control 812A, which allows the user to toggle back to displaying all entries in post-display region 808, a Write New Entry control 812B, which allows the user to write a new post (see, e.g., New Entry UI 700, above), a Delete This Entry control 812C, allows the user to delete post 804, and a Share control 812D, which allows the user to share post 804 with one or more other members of the online social-interaction system. As seen in FIG. 9, if post 804 is another member's post, the online social-interaction system may display a different set of sidebar controls, such as a View All Entries control 900A, which allows the user to toggle back to displaying all entries in post-display region 808, a Share control 900B, which allows the user to share the post with other members, such as Friends and Close Friends, a Report Abuse control 900C, which allows the user to report posts that are offensive, etc., and a Subscribe control 900D that allows the user to subscribe to the private journal of the other member that originally made the post if the user is not already a subscriber to that member.

Referring again to FIG. 8, for each post displayed in post-display region 808, here post 804, the online social-interaction system displays a number of response controls, here a Post Comment control 816A, which allows the user to post a comment to post 804 (here comment 820), a Support selector 816B, which allows the user to indicate that she/he supports the post, and an Add To My Prayer List selector 816C, which allows the user to add a followup reminder to her/his prayer list (not shown, but which is accessible via prayer-list link 528D (FIG. 5)). Intentionally not included in the Prayer Requests journal and the Forgiveness and Healing journal are a Like selector, which allows the user to indicates that she/he likes the post, and a Favorites selector, which allows the user to add the post to her/his Favorites list (not shown, but which is accessible via Favorites link 528G (FIG. 5)). As seen in FIG. 9, when the user has made any one or more responses using controls 816A to 816E, the online social-interaction system may update corresponding information displayed along with the post, such as comment summary 904A, support summary 904B, and prayer summary 904C.

Figure 10:
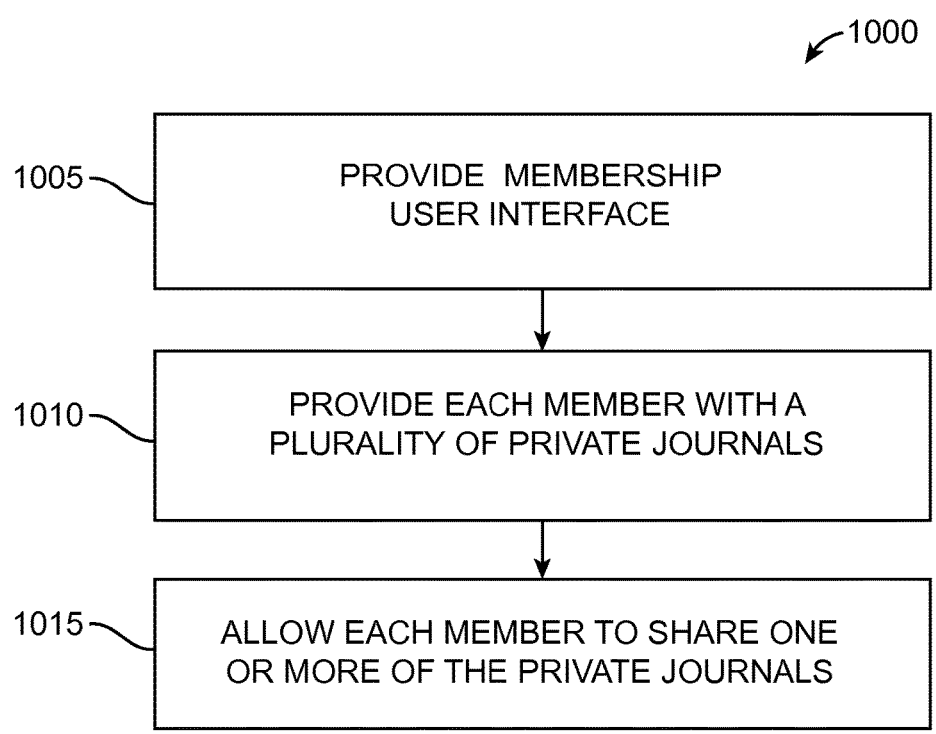
FIG. 10 is a flow diagram illustrating a method of facilitating interaction among members sharing a plurality of common aspects using private journals directed to those aspects.

In view of the foregoing disclosure, following are several methods an online social-interaction system of the present invention can perform. Referring first to FIG. 10, this figure illustrates an exemplary method 1000 of facilitating interaction among members sharing a plurality of common aspects using private journals directed to those aspects. As an example of common aspects of method 1000, in the religion-themed online social-interaction system described above in connection with the screenshots of FIGS. 5-9 the common aspects are gratitude, prayer, meditation, forgiveness and healing, poems and quotes, and daily reflection, which are expressed in the six private journals available via private-journal links 516(1) to 516(6) of FIG. 5, namely, the Gratitude Journal, the Prayer Requests journal, the Prayers and Meditations journal, the Forgiveness and Healing journal, the Poems and Quotes journal, and the Every Steps journal. Method 1000 may begin at step 1005, at which the online social-interaction system provides a membership UI that is designed and configured to allow each member to join the social interaction system. In one embodiment, the membership UI includes an attribute selector that allows the member to select the attribute, for example, religion, that identifies an affiliation of the member.

At step 1010, the online social-interaction system provides each member with a plurality of private journals, such as the Gratitude Journal, the Prayer Requests journal, the Prayers and Meditations journal, the Forgiveness and Healing journal, the Poems and Quotes journal, and the Every Steps journal, which may have features and functionalities as described above. Of course, online social-interaction system may provide more or fewer private journals than these six, and the aspect(s) addressed by the private journals may be different from the aspects illustrated. At step 1015, once the online social-interaction system has provided each member with the plurality of private journals, the system allows each member to choose with which other member(s) she/he will share entries of the private journals. The online social-interaction system may allow each member to share her/his private journal entries in any of a number of ways, such as by creating All Friends and/or Close Friends that can see posts from each of one or more of the private journals based on their All Friends/Close Friend status and/or by controlling the viewability of each individual post to any private journal in conjunction with creating that post, among others. In addition, the online social-interaction system can be configured to allow private journals to be shared on a journal-by-journal basis, with some being shared with All Friends, some being shared only with Close Friends, and some not being shared at all. Those skilled in the art will readily appreciate the wide variety of ways in which a use can elect to share each of the private journals.

Figure 11:
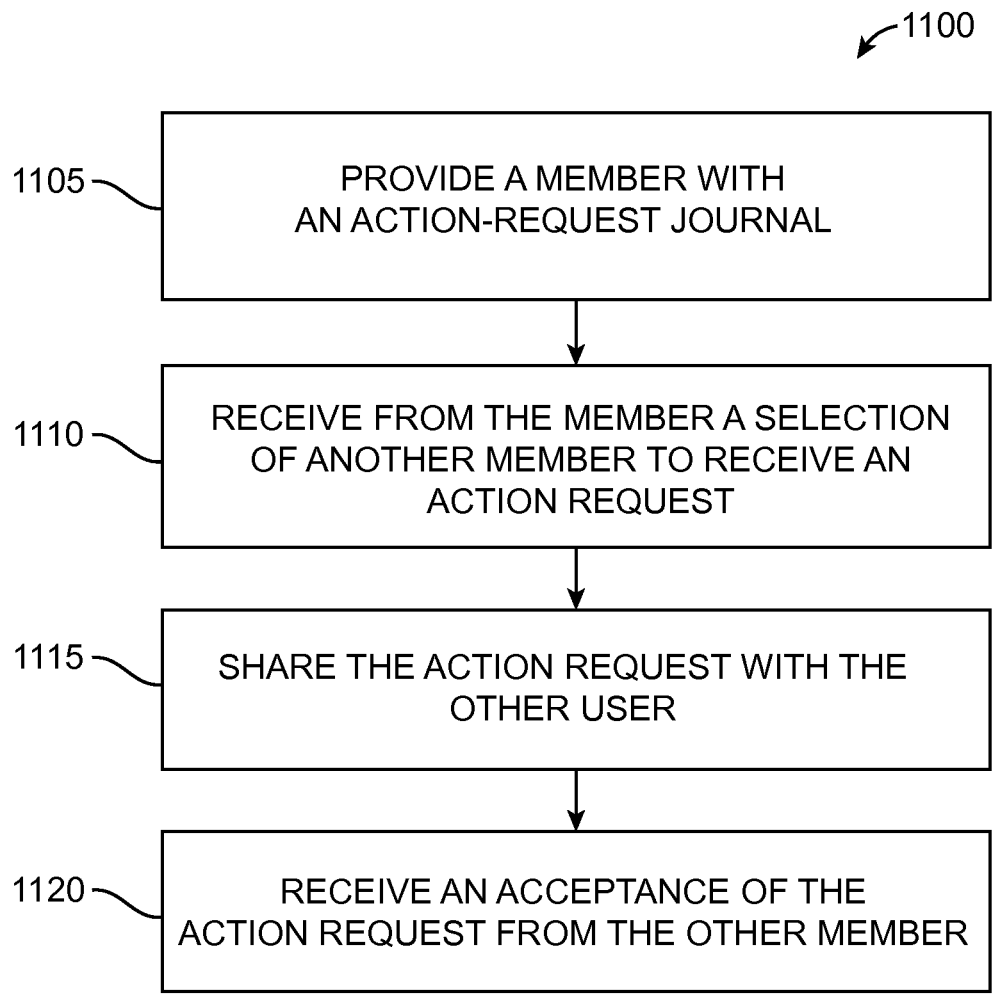
FIG. 11 is a flow diagram illustrating a method of facilitating interaction among members by implementing action-request and action-followup functionalities.

FIG. 11 illustrates an exemplary method 1100 of facilitating interaction among members of an online community by implementing action-request and action-followup functionalities. Method 1100 may begin at step 1105 at which the online social-interaction system provides a first member with an action-request journal designed and configured to allow the first member to post and action request. In the example of the religion-themed online social-interaction system described above in connection with the screenshots of FIGS. 5-9, an action request may be a prayer request that a user can make via the Prayer Requests journal (i.e., the "action-request journal") that the first member may activate by selecting Prayer-Requests journal link 516(2) of FIG. 5. At step 1110, the online social-interaction system may receive from the first member a selection of a second member of the online social-interaction system as a friend with which the first member is willing to share the action request the first user makes. This selection may be made in any suitable manner, such as using All Friends/Close Friends features and functionalities, among other things. At step 1115, the online social-interaction system shares the action request with the second member as a function of receiving the selection of the second member at step 1110. This sharing may be done in any of a variety of manners, such as the online social-interaction system posting the action request to a UI page of the second member that displays posts made by other members.

At step 1120, the online social-interaction system receives an acceptance of the action request from the second member. This acceptance can be received in any of a number of manners, such as by the second member selecting an add-to-my-action-list selector (see, e.g., Add To My Prayer List selector 816E of FIG. 8). After the online social-interaction system has received the acceptance of step 1120, any one or more of other steps may be performed, such as printing action-item lists and notifying the first member and/or others that the acceptance has occurred. In addition, action-request features and functionalities can include followup volunteers that receive action requests in one or more manners different from the manner just described. For example and as described above in detail, the action request may be a request that the action be taken by the one or more volunteers in a volunteer program. This may be done, for example, using prayer-volunteer-program selector 724 of FIG. 7. Examples of how such requests are disseminated to volunteers are described above.

Figure 12:
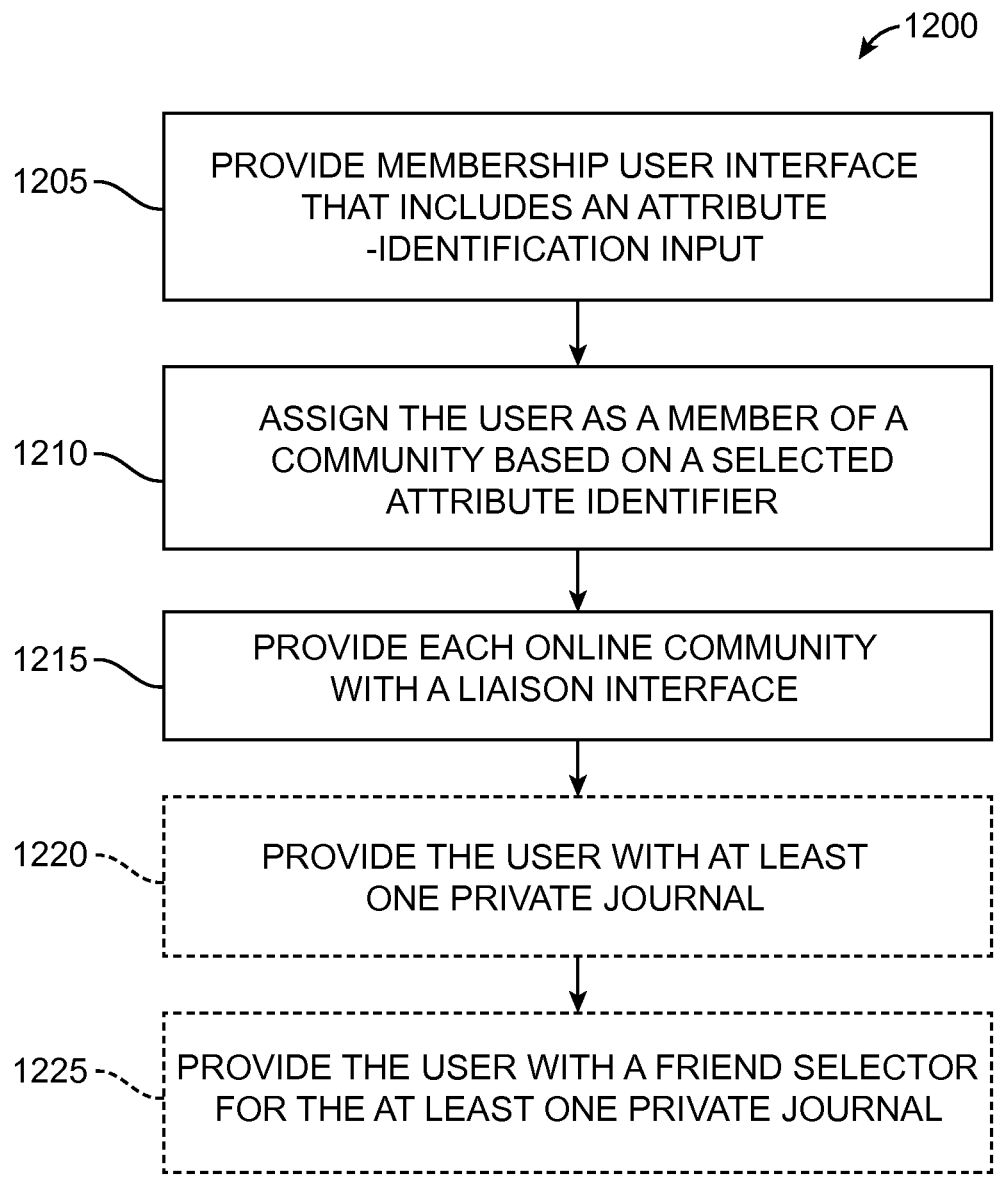
FIG. 12 is a flow diagram illustrating a method of facilitating inter-community learning within a multi-community online social-interaction system using liaison interfaces.

FIG. 12 illustrates an exemplary method 1200 of facilitating intercommunity learning within an online social-interaction system that has a plurality of online communities corresponding respectively to a plurality of differing attributes of a common theme. Method 1200 may begin at step 1205 at which the online social-interaction system provides a membership UI that includes an attribute-identification input designed and configured to allow a user to input an attribute-identifier identifying which attribute the user desires to be associated with. As mentioned above, the attributes available in a particular multi-community online social-interaction system depends upon the theme of the system. Several examples are provided above for religion-themed systems and education-themed systems. At step 1210, the online social interaction system assigns the user as a member of the one of the plurality of online communities corresponding to the attribute identified by the user via the attribute identifier input by the user. The online social-interaction system establishes this online community the home community, thereby establishing every other one of the plurality of online communities as a non-home community. At step 1215, the online social-interaction system provides each of the plurality of online communities with a liaison interface that allows the user of the home community to liaise with each of the non-home communities. Examples of features and functionalities that each liaison interface may provide are described, for example, above in connection with FIG. 4 and in connection with introducing the online social-interaction system of FIGS. 5-9. At optional step 1220, the online social-interaction system provides the user with at least one private journal that may have some or all of the features and functionalities described above relative to private journals, including action-request features and functionalities. At optional step 1225, the online social-interaction system provides a friend selector that permits the user to share the private journal(s) with members of the home community but not with members of the non-home communities. In this manner, the online social-interaction system keeps the pluralities of online communities remain largely separate, while at the same time promoting controlled inter-community interaction, for example, to promote learning, tolerance, awareness, etc.

Figure 13:
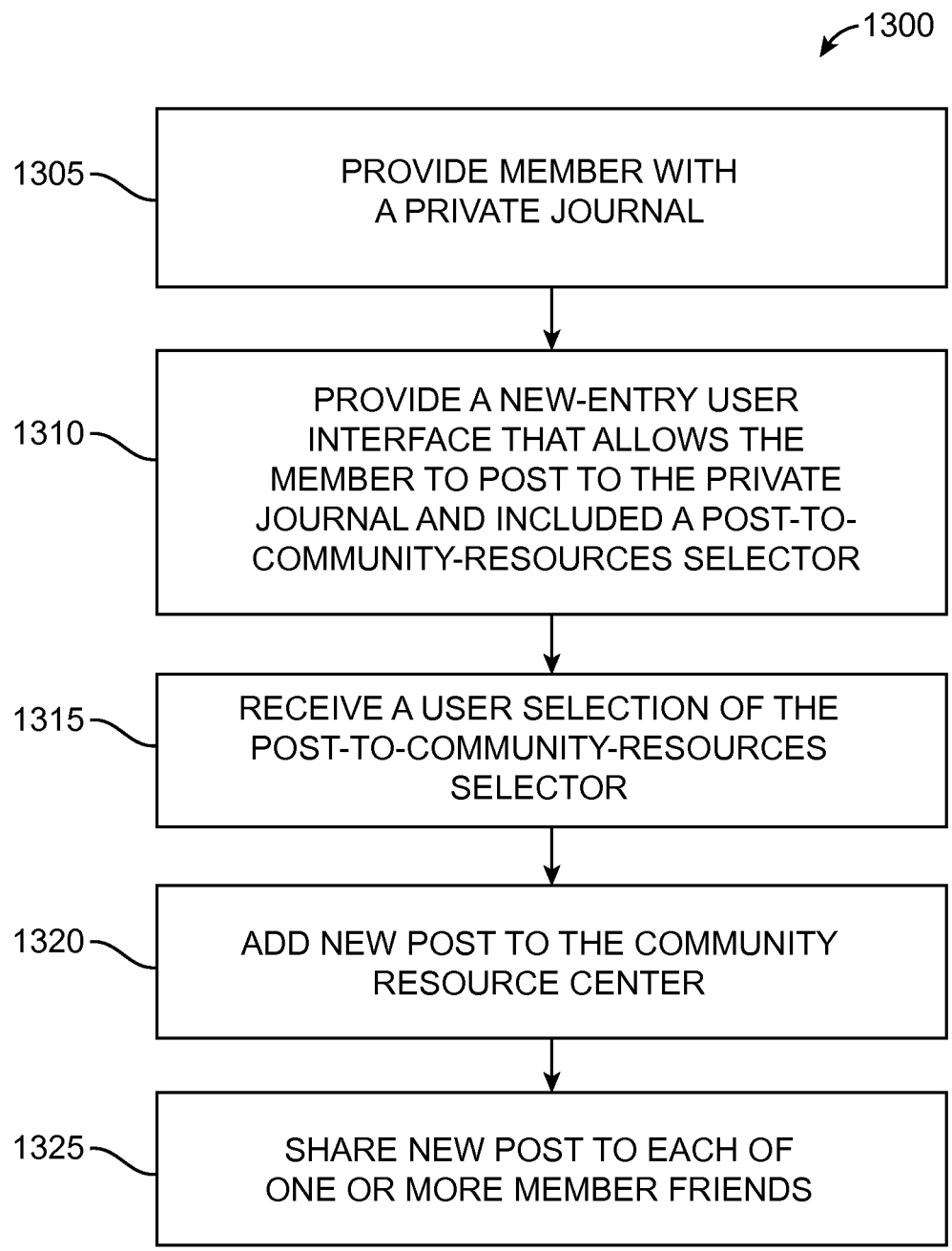
FIG. 13 is a flow diagram illustrating a method of allowing a member of an online social-interaction system to share a learning resource with other members via a private journal.

FIG. 13 illustrates and exemplary method 1300 of allowing a member of an online social-interaction system to share a learning resource with one or more other members via a private journal. Method 1300 may begin at step 1305 at which an online social-interaction system provides the member with a private journal. The private journal may have any or all of the private-journal features and functionalities described above in numerous places. At step 1310, the online social-interaction system provides a new-entry UI that allows the member to create a new post to the private journal. Posts may include, for example, post that contain a link to an educational or other informational resource that members of the non-All Friends and non-Close Friend members can benefit from having access to. Consequently, the new-entry UI includes a post-to-resources selector that allows the member to selectively add the new post to a resource center that is available to all members so as to make such universally useful resources available to all members of the online social-interaction system, despite the origin being in a private journal. At step 1315, the online social-interaction system receives a user selection of the post-to-resources selector. At step 1320, the online social-interaction system adds the new post to the resource center as a function of receiving the user selection at step 1315. At this point, all members of the online social-interaction system can now access the educational/informational resource via the resource center. At step 1325, the online social-interaction system also shares the new post to each of one or more member-friends that the member has friended via the online social-interaction system so that it is available like other posts made via the private journal. Various friending features and functionalities and sharing features and functionalities are described above and may be used in conjunction with method 1300. In an alternative/additional method related to method 1300, the new-entry UI provided at step 1310 may include an add-resource-center-link-to-post control that the member making the new post can select if she/he wants to make it easy for readers of the entry to navigate to the resource center or to a specific resource within the resource center. In response to the posting member selecting the add-resource-center-link-to-post selector, the online social-interaction system adds a link to the post to the resource center or specific resource to allow readers to link thereto. In some embodiments, the posting of a link to a particular resource contained in the resource center may be made available beyond All Friends and Close Friends, such as be made available to the entire online social-interaction system.

Figure 14:
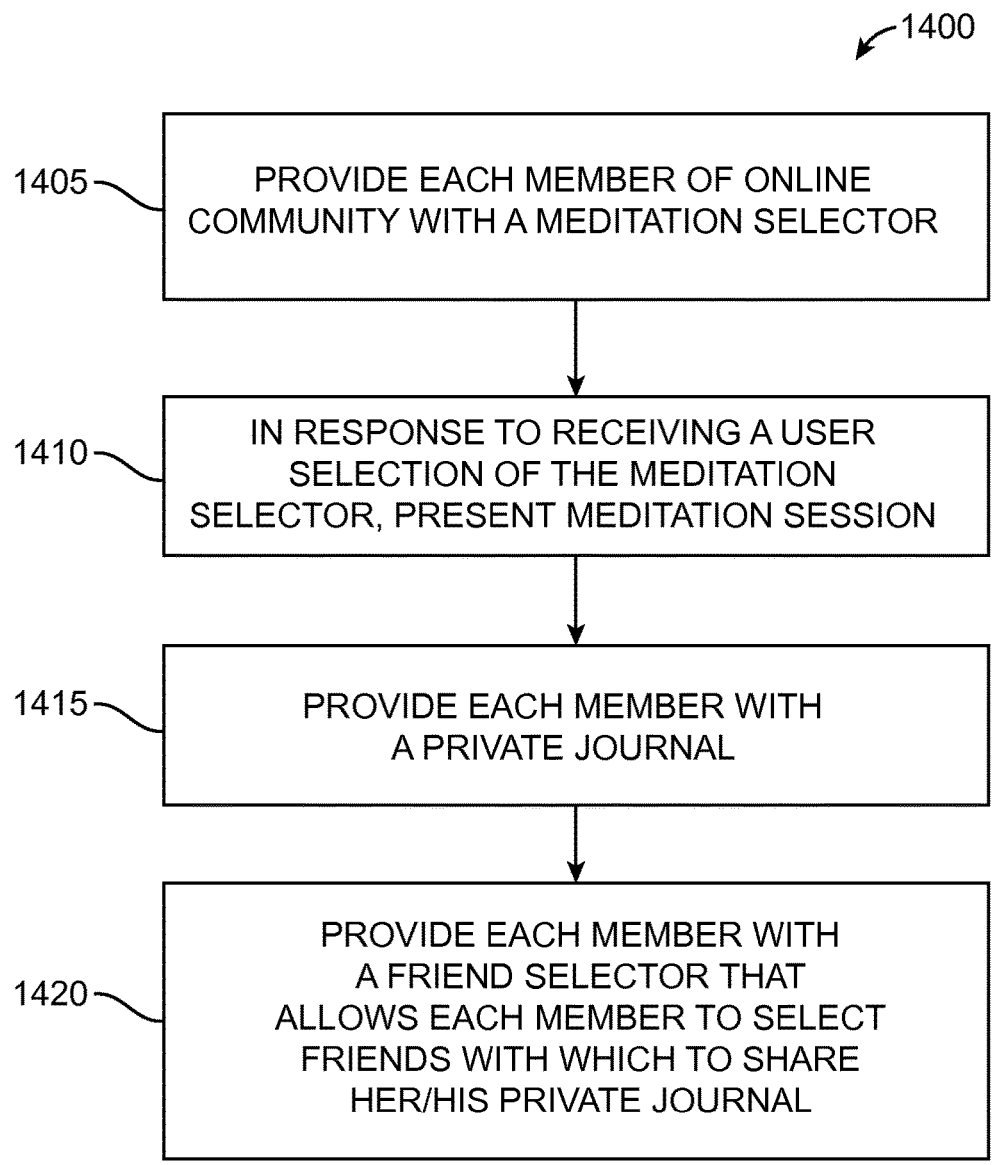
FIG. 14 is a flow diagram illustrating a method of providing an online social-interaction system that includes features and functionalities for allowing members to participate in online meditation sessions.

FIG. 14 illustrates and exemplary method 1400 of providing an online social-interaction system that includes features and functionalities for allowing each member of the online social-interaction system to participate in an online meditation session. Method 1400 may begin at step 1405 at which the online social-interaction system provides each of the members with a meditation selector designed and configured to initiate an online meditation session. The online meditation session may be either a live session that is currently occurring within the online social-interaction system or is about to start or is a prerecorded session. The online meditation session may also be of any suitable format, such as an audio format, a video format, a multimedia format, etc. Fundamentally, there is not limitation on the format of an online meditation session that can be used with method 1400. The meditation selector may be any suitable soft-control selector and may be present in any of a variety of locations, such as on a private-UI page of each member, on a meditation-UI page, etc. At step 1410, in response to the online social-interaction system receiving a user-selection of the meditation selector by one of the members, the system presents the online meditation session to that one of the plurality of members that made the selection. This meditation functionality is provided in the context of an online social-interaction system. Consequently, at step 1415 the online social-interaction system provides each of the members of the online social-interaction system with a private journal, which may have any or all of the private-journal features and functionalities described herein. At step 1420, the online social-interaction system provides each of the members with a friend selector that allows that member to select which one or more other members can view posts to the private journal. Various friending features and functionalities and sharing features and functionalities are described above and may be used in conjunction with method 1400.

It is to be noted that any one or more of the aspects and embodiments described herein may be conveniently implemented using one or more machines (e.g., one or more computing devices that are utilized as a user computing device, one or more server devices, such as an application server, etc.) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an 9PROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a wearable computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
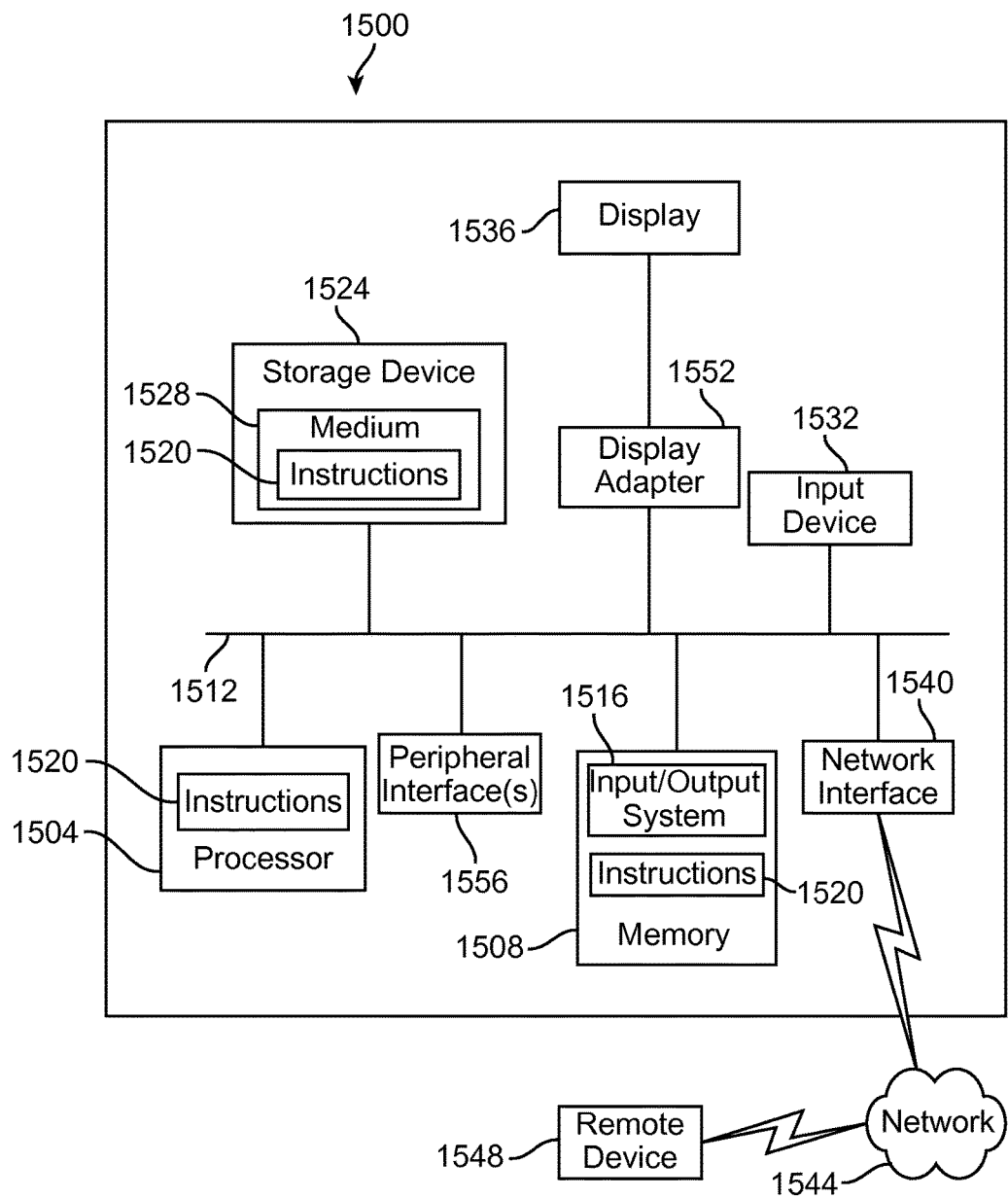
FIG. 15 is a high-level block diagram illustrating a computing system that can be used in connection with executing software that provides any one or more of the features and functionalities described herein and that will occur to those skilled in the art after reading this entire disclosure.

FIG. 15 shows a diagrammatic representation of one embodiment of a computing device in the exemplary form of a computer system 1500 within which a set of instructions for causing a control system to perform any one or more of the aspects and/or methodologies of the present disclosure, such as implementing any one or more of online social-interaction systems 100, 216, 300, and 400 and/or any or more of methods 1000, 1100, 1200, 1300, and 1400, among others, may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine readable media) including, but not limited to, a random access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), I9E 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Additional aspects of the present invention include the following:

A first method of facilitating interaction among members sharing a plurality of first common aspects, the method being executed by an online social-interaction system and comprising: providing a membership user interface designed and configured to allow each of the members to join the online social-interaction system; in response to each member joining the online social-interaction system, providing that member with a plurality of private journals, wherein each private journal has a name identifying a corresponding one of the plurality of common aspects; and allowing each member to select one or more others of the members with which to share ones the plurality of private journals.

A method according to the first method, wherein the online social-interaction system comprises a plurality of online communities having a common theme but having a corresponding respective plurality of differing attributes, wherein: said providing a membership user interface includes providing a membership user interface having an attribute-identification input designed and configured to allow a user to input an attribute-identifier identifying which attribute the user desires to be associated with; and the method further includes assigning the user as a member of the one of the plurality of online communities corresponding to the attribute identified by the attribute identifier input by the user.

A method according to the immediately preceding method, wherein the common theme of the plurality of online communities is religion and the plurality of differing attributes is a plurality of differing religions.

A method according to the first method, wherein the first online community is a religion-based community and said providing each member with a plurality of private journals includes providing a prayer-request journal.

A second method of facilitating interaction among members of an online community, the method being executed by an online social-interaction system and comprising providing a first member with an action-request journal designed and configured to allow the first member to post an action request; receiving from the first member a selection of a second member of the online community as a friend; sharing the action request with the second member of the online community as a function of said receiving of the selection of the second member; and receiving an acceptance of the action request from the second member.

A method according to the second method, further comprising adding an action item to an action list of the second member in response to said receiving the acceptance of the action request made by the first member.

A method according to the immediately preceding method, wherein the online social-interaction system provides the second user with a private online workspace and the method further comprises displaying a user-interface page to the second user, wherein: the user-interface page is designed and configured to allow the second user to manage the private online workspace; and the user-interface page includes an action-list link to action list.

A method according to the second method, further comprising providing a print-action-list control to the second user, wherein the print-action-list control is designed and configured to allow the second member to print the action list for follow up when away from the online social-interaction system.

A method according to the second method, wherein said providing the first member with an action-request journal includes providing an action-request-entry screen that includes: an action-request-input region for allowing the first member to input the action request; and a send-request control designed and configured to send the action request to an action-follow-up volunteer that has volunteered to follow-up on the action request.

A method according to the immediately preceding method, further comprising providing a volunteer-program interface designed and configured to allow members to join an action-follow-up volunteer program.

A third method of facilitating inter-community learning within a multi-community online social-interaction system that manages the plurality of online communities, wherein the plurality of online communities have a common theme but have a corresponding respective plurality of differing attributes, the method being executed by the multi-community online social-interaction system and comprising: providing a membership user interface that includes an attribute-identification input designed and configured to allow a user to input an attribute-identifier identifying which attribute the user desires to be associated with; assigning the user as a member of the one of the plurality of online communities corresponding to the attribute identified by the attribute identifier input by the user so as to provide the user with a home community, thereby establishing every other one of the plurality of online communities as a non-home community; providing each of the plurality of online communities with a liaison interface that allows the user of the home community to liaise with each of the non-home communities; providing the user with a private journal; and providing a friend selector that permits the user to share the private journal with members of the home community and not members of the non-home communities.

A method according to the third method, further comprising establishing for each non-home online community a set of liaison volunteers, wherein said providing each of the plurality of non-home online communities with a liaison interface includes providing each of the plurality of non-home online communities with a liaison interface that allows the user to interact with a member of each non-home online community only if the member is a liaison volunteer.

A method according to the third method, wherein said providing each of the plurality of non-home online communities with a liaison interface includes providing each of the plurality of non-home online communities with a liaison interface that allows the user to access learning resources directed to the corresponding attribute of that one of the plurality of non-home online communities.

A method according to the third method, further comprising a community-selection interface to the user, wherein the community-selection interface includes a selector for at least one non-home online community and the selector is designed and configured to, upon selection by the user, engage the user with the liaison interface of the at least one non-home online community.

A fourth method of allowing a member of an online community to share a learning resource with other members of the online community, the method being executed by an online social-interaction system and comprising: providing the member of the online community with a private journal; providing a new-entry user interface that allows the member to create a new post to the private journal, the new-entry user interface including a post-to-community-resources selector that allows the member to add the new post to a community resources center; receiving a user selection of the post-to-community-resources selector; adding the new post to the community resources center as a function of said receiving a user selection; and sharing the new post to each of one or more member-friends that the member has friended via the online community.

A method according to the fourth method, wherein the new post comprises a knowledge resource.

A method according to the fourth method, wherein said providing a private journal includes providing a forgiveness and healing journal.

A method according to the fourth method, wherein the new post comprises forgiveness resources.

A fifth method of providing an online community within an online social-interaction system, the method being performed by the social-interaction system and comprising: providing each of a plurality of members with a meditation selector designed and configured to initiate an online meditation session; in response to receiving a user-selection of the meditation selector by one of the plurality of members, presenting the online meditation session to that one of the plurality of members; providing each of a plurality of members of the online community with a private journal; and providing each of a plurality of members with a friend selector that allows that member to select which other member(s) of the online community can view posts to the private journal.

A method according to the fifth method, wherein said presenting a meditation session includes presenting a pre-recorded meditation session.

A method according to the fifth method, wherein said presenting a meditation session includes presenting a live meditation session.

A method according to the fifth method, further comprising receiving member-profile information from that one of the plurality of members, and selecting the meditation session as a function of the member-profile information.

A computer-readable storage medium containing computer-executable instructions for performing any one or more of the foregoing methods.

What is claimed is:

1. A method of facilitating interaction among members of an online social-interaction system wherein the members share a common aspect, the method being executed by the online social-interaction system and comprising:
    providing a membership user interface designed and configured to allow each of the members to join the online social-interaction system;
    in response to each member joining the online social-interaction system, providing that member with at least one private journal, wherein said at least one private journal:
        is private to that member, meaning that entries made to said at least one private journal by that member are viewable only by that member unless that member elects to share one or more of the entries;
        has a name identifying the common aspect; and
        includes a new-entry user interface designed and configured to allow that member to add the entries and, for each of the entries, to display a privacy selector that allows that member to select any privacy setting from the group of 1) just me, 2) close friends, and 3) All Friends, wherein the privacy setting of just me allows only that member to view an entry, the privacy setting of close friends allows that member to share an entry only with other ones of the members that that member has designated as close friends, and the privacy setting of All Friends allows that member to share an entry only with other ones of the members that that member has designated as friends; and
        includes a post-display window having a post-display region that displays a plurality of posts when the posts are available for posting;
    receiving, via said at least one private journal of a particular one of the members, a new entry from the particular member;
    receiving, via said privacy selector, a user selection from the particular member of one of 1) just me, 2) close friends, and 3) All Friends;
    if the user selection is just me, then keeping the new entry viewable only by the particular member; and
    if the user selection is close friends or All Friends, then sharing the new entry with either only close friends or All Friends, depending on the user selection;
    wherein said providing at least one private journal includes providing an action-request journal designed and configured to post an add-to-action-list selector with the new entry so that when the action-request journal displays the new entry in the post-display region, the action-request journal displays the add-to-action-list selector among the plurality of posts within the post-display region of the post-display window;
    wherein the new entry and add-to-action-list selector are each posted by a first member of the members, the method further comprising receiving a user selection of the add-to-action-list selector by a second member of the members; and adding an action item to an action list of the second member in response to said receiving the user selection of the add-to-action-list selector.

2. The method according to claim 1, wherein the members share a plurality of common aspects, the method comprising, in response to each member joining the online social-interaction system, providing that member with a plurality of private journals, wherein each private journal has a name identifying a corresponding one of the plurality of common aspects of the first online community, wherein each of the plurality of private journals includes a new-entry user interface designed and configured to allow each member to select to share a new entry from among a selection of 1) just me, 2) close friends, and 3) All Friends.

3. The method according to claim 2, wherein the online social-interaction system comprises a plurality of online communities having a common theme but having a corresponding respective plurality of differing attributes, wherein:

said providing a membership user interface includes providing a membership user interface having an attribute-identification input designed and configured to allow a user to input an attribute-identifier identifying which attribute the user desires to be associated with; and the method further includes assigning the user as a member of the one of the plurality of online communities corresponding to the attribute identified by the attribute identifier input by the user.

4. The method according to claim 3, wherein the common theme of the plurality of online communities is religion and the plurality of differing attributes is a plurality of differing religions.

5. The method according to claim 1, wherein the action-request journal is a prayer-request journal.

6. The method according to claim 1, wherein the action-request journal is a forgiveness and healing journal.

7. The method according to claim 1, wherein the online social-interaction system provides the second user with a private online workspace and the method further comprises displaying a user-interface page to the second user, wherein:

the user-interface page is designed and configured to allow the second user to manage the private online workspace; and the user-interface page includes an action-list link to action list.

8. The method according to claim 1, further comprising providing a print-action-list control to the second user, wherein the print-action-list control is designed and configured to allow the second member to print the action list for follow up when away from the online social-interaction system.

9. The method according to claim 1, wherein the new-entry user interface includes a send-to-volunteer selector.

10. The method according to claim 9, further comprising providing a volunteer-program interface designed and configured to allow members to join an action-follow-up volunteer program.

11. The method according to claim 1, further comprising providing the new-entry user interface with a link-to-resource control that allows each of the members to include a link with the new entry that links to a resource with a center of the online-social interaction system.

12. The method according to claim 1, wherein the social-interaction system has a religions theme supporting a plurality of religions.

13. A non-transitory computer-readable storage medium containing computer-executable instructions for performing a method of facilitating interaction among members of an online social-interaction system wherein the members share a common aspect, the method being executed by the online social-interaction system and comprising:

providing a membership user interface designed and configured to allow each of the members to join the online social-interaction system;

in response to each member joining the online social-interaction system, providing that member with at least one private journal, wherein said at least one private journal:

is private to that member, meaning that entries made to said at least one private journal by that member are viewable only by that member unless that member elects to share one or more of the entries;

has a name identifying the common aspect; and includes a new-entry user interface designed and configured to allow that member to add the entries and, for each of the entries, to display a privacy selector that allows that member to select any privacy setting from the group of 1) just me, 2) close friends, and 3) All Friends, wherein the privacy setting of just me allows only that member to view an entry, the privacy setting of close friends allows that member to share an entry only with other ones of the members that that member has designated as close friends, and the privacy setting of All Friends allows that member to share an entry only with other ones of the members that that member has designated as friends; and includes a post-display window having a post-display region that displays a plurality of posts when the posts are available for posting;

receiving, via said at least one private journal of a particular one of the members, a new entry from the particular member;

receiving, via said privacy selector, a user selection from the particular member of one of 1) just me, 2) close friends, and 3) All Friends;

if the user selection is just me, then keeping the new entry viewable only by the particular member; and if the user selection is close friends or All Friends, then sharing the new entry with either only close friends or All Friends, depending on the user selection;

wherein said providing at least one private journal includes providing an action-request journal designed and configured to post an add-to-action-list selector with the new entry so that when the action-request journal displays the new entry in the post-display region, the action-request journal displays the add-to-action-list selector among the plurality of posts within the post-display region of the post-display window;

wherein the new entry and add-to-action-list selector are each posted by a first member of the members, the method further comprising receiving a user selection of the add-to-action-list selector by a second member of the members; and adding an action item to an action list of the second member in response to said receiving the user selection of the add-to-action-list selector.

14. The non-transitory computer-readable storage medium according to claim 13, wherein the members share a plurality of common aspects, the method comprising, in response to each member joining the online social-interaction system, providing that member with a plurality of private journals, wherein each private journal has a name identifying a corresponding one of the plurality of common aspects of the first online community, wherein each of the plurality of private journals includes a new-entry user interface designed and configured to allow each member to select to share a new entry from among a selection of 1) just me, 2) close friends, and 3) All Friends.

15. The non-transitory computer-readable storage medium according to claim 14, wherein the online social-interaction system comprises a plurality of online communities having a common theme but having a corresponding respective plurality of differing attributes, wherein:

said providing a membership user interface includes providing a membership user interface having an attribute-identification input designed and configured to allow a user to input an attribute-identifier identifying which attribute the user desires to be associated with; and the method further includes assigning the user as a member of the one of the plurality of online communities corresponding to the attribute identified by the attribute identifier input by the user.

16. The non-transitory computer-readable storage medium according to claim 15, wherein the common theme of the plurality of online communities is religion and the plurality of differing attributes is a plurality of differing religions.

17. The non-transitory computer-readable storage medium according to claim 13, wherein the online social-interaction system provides the second user with a private online workspace and the method further comprises displaying a user-interface page to the second user, wherein:

the user-interface page is designed and configured to allow the second user to manage the private online workspace; and the user-interface page includes an action-list link to action list.

18. The non-transitory computer-readable storage medium according to claim 13, wherein the method further comprises providing a print-action-list control to the second user, wherein the print-action-list control is designed and configured to allow the second member to print the action list for follow up when away from the online social-interaction system.

19. The non-transitory computer-readable storage medium according to claim 13, wherein the new-entry user interface includes a send-to-volunteer selector.

20. The non-transitory computer-readable storage medium according to claim 13, wherein the social-interaction system has a religions theme supporting a plurality of religions.

* * * * *